United States Patent
Koch et al.

(10) Patent No.: US 7,385,992 B1
(45) Date of Patent: Jun. 10, 2008

(54) INTERNET CALLER-ID INTEGRATION

(75) Inventors: Robert A. Koch, Norcross, GA (US); Scott C. Holt, Decatur, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 894 days.

(21) Appl. No.: 10/144,556

(22) Filed: May 13, 2002

(51) Int. Cl.
*H04L 12/28* (2006.01)

(52) U.S. Cl. .............. 370/401; 379/142.01; 455/415
(58) Field of Classification Search ............... None
See application file for complete search history.

(56) References Cited

U.S. PATENT DOCUMENTS

| | | | |
|---|---|---|---|
| 4,266,098 A | 5/1981 | Novak | |
| 4,268,722 A | 5/1981 | Little et al. | |
| 4,277,649 A | 7/1981 | Sheinbein | |
| 4,582,956 A | 4/1986 | Doughty | |
| 4,649,433 A | 3/1987 | Chorley et al. | 370/400 |
| 4,663,777 A | 5/1987 | Szeto | |
| 4,698,839 A | 10/1987 | DeVaney et al. | |
| 4,791,664 A | 12/1988 | Lutz et al. | |
| 4,797,911 A | 1/1989 | Szlam et al. | |
| 4,802,202 A | 1/1989 | Takahashi et al. | |
| 4,817,133 A | 3/1989 | Takahashi et al. | |
| 4,823,304 A | 4/1989 | Frantz et al. | |
| 4,845,743 A | 7/1989 | Lutz | |
| 4,850,013 A | 7/1989 | Rose | |
| 4,850,103 A | 7/1989 | Takemoto et al. | |
| 4,995,075 A | 2/1991 | Angiolillo-Bent et al. | |
| 5,029,196 A | 7/1991 | Morganstein | |
| 5,109,405 A | 4/1992 | Morganstein | |
| 5,121,423 A | 6/1992 | Morihiro et al. | 379/142 |
| 5,151,929 A | 9/1992 | Wolf | |
| 5,157,712 A | 10/1992 | Wallen, Jr. | |
| 5,161,181 A | 11/1992 | Zwick | |
| 5,200,994 A | 4/1993 | Sasano et al. | |
| 5,206,901 A | 4/1993 | Harlow et al. | |
| D338,889 S | 8/1993 | Fuqua et al. | D14/240 |
| 5,260,987 A | 11/1993 | Mauger | |
| 5,263,084 A | 11/1993 | Caput et al. | 379/215 |

(Continued)

FOREIGN PATENT DOCUMENTS

EP     0821511     1/1998

(Continued)

OTHER PUBLICATIONS

Rekhter et al., "Address Allocation for Private Internets", Feb. 1996, pp. 1-8.

(Continued)

*Primary Examiner*—Huy D. Vu
*Assistant Examiner*—Clemence Han
(74) *Attorney, Agent, or Firm*—Cantor Colburn LLP

(57) ABSTRACT

One preferred embodiment of the present invention provides systems and methods for supplying calling party information to a receiving party having an Internet-connected device. Briefly described, in architecture, one embodiment, among others, includes an Internet caller-ID system configured to detect if a telephone call to a receiving party is designated for Internet caller-ID service. If the service is designated, the caller-ID system generates and sends an Internet caller-ID message to the receiving party. Other systems and methods are also provided.

78 Claims, 12 Drawing Sheets

U.S. PATENT DOCUMENTS

| | | | |
|---|---|---|---|
| 5,265,145 A | 11/1993 | Lim | 379/88 |
| 5,274,699 A | 12/1993 | Ranz | 379/142 |
| 5,278,894 A | 1/1994 | Shaw | |
| 5,289,542 A | 2/1994 | Kessler | 380/9 |
| 5,315,650 A | 5/1994 | Smith et al. | 379/399 |
| 5,329,578 A | 7/1994 | Brennan et al. | |
| 5,333,152 A | 7/1994 | Wilber | |
| 5,338,889 A | 8/1994 | Vora et al. | |
| 5,341,411 A | 8/1994 | Hashimoto | |
| 5,347,574 A | 9/1994 | Morganstein | |
| 5,361,295 A | 11/1994 | Solomon et al. | |
| 5,383,466 A | 1/1995 | Partika | |
| 5,386,460 A | 1/1995 | Boakes et al. | |
| 5,388,150 A | 2/1995 | Schneyer et al. | |
| 5,413,605 A | 5/1995 | Ashby et al. | |
| 5,420,910 A | 5/1995 | Rudokas et al. | |
| 5,420,914 A | 5/1995 | Blumhardt | 379/114.09 |
| 5,420,920 A | 5/1995 | Capper et al. | |
| 5,425,076 A | 6/1995 | Knippelmier | |
| 5,425,089 A | 6/1995 | Chan et al. | 379/183 |
| 5,430,719 A | 7/1995 | Weisser, Jr. | |
| 5,446,785 A | 8/1995 | Hirai | |
| 5,452,089 A | 9/1995 | Bushman | |
| 5,452,346 A | 9/1995 | Miyamoto | 379/142 |
| 5,459,779 A | 10/1995 | Backaus et al. | 379/212.01 |
| 5,466,785 A | 11/1995 | de Framond | |
| 5,467,388 A | 11/1995 | Redd, Jr. et al. | |
| 5,475,748 A | 12/1995 | Jones et al. | |
| 5,481,594 A | 1/1996 | Shen et al. | 379/67 |
| 5,481,599 A | 1/1996 | MacAllister et al. | 379/101 |
| 5,481,602 A | 1/1996 | Griffiths et al. | |
| 5,490,205 A | 2/1996 | Kondo et al. | |
| 5,497,414 A | 3/1996 | Bartholomew | |
| 5,502,762 A | 3/1996 | Andrew et al. | |
| 5,506,893 A | 4/1996 | Buscher et al. | |
| 5,511,111 A | 4/1996 | Serbetcioglu et al. | |
| 5,530,741 A | 6/1996 | Rubin | 379/142 |
| 5,533,106 A | 7/1996 | Blumhardt | |
| 5,535,265 A | 7/1996 | Suwandhaputra | |
| 5,546,447 A | 8/1996 | Skarbo et al. | 379/142 |
| 5,550,900 A | 8/1996 | Ensor et al. | |
| 5,550,905 A | 8/1996 | Silverman | 379/142 |
| 5,563,935 A | 10/1996 | Small | |
| 5,563,936 A | 10/1996 | Washington | |
| 5,602,908 A | 2/1997 | Fan | |
| 5,608,788 A | 3/1997 | Demlow et al. | 379/142.07 |
| 5,619,561 A | 4/1997 | Reese | 379/142 |
| 5,631,950 A | 5/1997 | Brown | |
| 5,636,269 A | 6/1997 | Eisdorfer | |
| 5,644,629 A | 7/1997 | Chow | 379/142 |
| 5,646,979 A | 7/1997 | Knuth | |
| 5,657,372 A | 8/1997 | Ahlberg et al. | |
| D383,466 S | 9/1997 | Burrell et al. | D14/240 |
| 5,668,852 A | 9/1997 | Holmes | |
| 5,696,809 A | 12/1997 | Voit | |
| 5,696,815 A | 12/1997 | Smyk | 379/142 |
| 5,699,523 A | 12/1997 | Li et al. | |
| 5,701,301 A | 12/1997 | Weisser, Jr. | |
| 5,703,934 A | 12/1997 | Zicker et al. | |
| H1714 H | 3/1998 | Partridge, III | |
| 5,724,412 A | 3/1998 | Srinivasan | 379/93.23 |
| 5,734,706 A | 3/1998 | Windsor et al. | 379/142 |
| 5,742,668 A | 4/1998 | Pepe et al. | |
| 5,754,635 A | 5/1998 | Kim | 379/142 |
| 5,754,636 A | 5/1998 | Bayless et al. | |
| 5,754,775 A | 5/1998 | Adamson et al. | |
| 5,771,281 A | 6/1998 | Batten, Jr. | 379/93.23 |
| 5,771,283 A | 6/1998 | Chang et al. | 379/142 |
| 5,781,621 A | 7/1998 | Lim et al. | 379/142 |
| 5,784,444 A | 7/1998 | Snyder et al. | |
| 5,796,806 A | 8/1998 | Birckbichler | 379/67 |
| 5,799,072 A | 8/1998 | Vulcan et al. | |
| 5,802,160 A | 9/1998 | Kugell et al. | |
| 5,802,251 A | 9/1998 | Cohen et al. | 395/2.84 |
| 5,805,587 A | 9/1998 | Norris et al. | 370/352 |
| 5,805,682 A | 9/1998 | Voit et al. | 379/142.16 |
| 5,805,997 A | 9/1998 | Farris | |
| 5,809,128 A | 9/1998 | McMullin | |
| 5,812,533 A | 9/1998 | Cox et al. | |
| 5,812,649 A | 9/1998 | Shen | |
| 5,838,774 A | 11/1998 | Weisser, Jr. | |
| 5,841,838 A | 11/1998 | Itoh et al. | 379/67 |
| 5,841,850 A | 11/1998 | Fan | |
| 5,848,142 A | 12/1998 | Yaker | |
| 5,850,435 A | 12/1998 | Devillier | |
| 5,850,436 A | 12/1998 | Rosen et al. | |
| 5,857,017 A | 1/1999 | Ohi et al. | |
| 5,859,903 A | 1/1999 | Lee | 379/157 |
| 5,872,834 A | 2/1999 | Teitelbaum | |
| 5,872,934 A | 2/1999 | Whitehouse et al. | |
| 5,878,036 A | 3/1999 | Spartz et al. | |
| 5,883,942 A | 3/1999 | Lim et al. | |
| 5,884,144 A | 3/1999 | Chavez, Jr. et al. | |
| 5,894,504 A | 4/1999 | Alfred et al. | |
| 5,901,209 A | 5/1999 | Tannenbaum et al. | |
| 5,901,212 A | 5/1999 | True et al. | 379/215 |
| 5,903,636 A | 5/1999 | Malik | 379/142 |
| 5,905,794 A | 5/1999 | Gunn et al. | 379/382 |
| 5,907,596 A | 5/1999 | Karnowski | |
| 5,907,604 A | 5/1999 | Hsu | |
| 5,915,000 A | 6/1999 | Nguyen et al. | 379/52 |
| 5,917,817 A | 6/1999 | Dunn et al. | |
| 5,923,744 A | 7/1999 | Cheng et al. | |
| 5,930,701 A | 7/1999 | Skog | |
| 5,940,484 A | 8/1999 | DeFazio et al. | 379/142 |
| 5,943,416 A | 8/1999 | Gisby | |
| 5,946,363 A | 8/1999 | Rominger et al. | |
| 5,946,636 A | 8/1999 | Uyeno et al. | |
| 5,946,684 A | 8/1999 | Lund | |
| D413,605 S | 9/1999 | Thomas | D14/240 |
| 5,948,040 A | 9/1999 | DeLorme et al. | 701/201 |
| 5,949,865 A | 9/1999 | Fusinato | |
| 5,953,399 A | 9/1999 | Farris et al. | 379/201 |
| 5,953,657 A | 9/1999 | Ghisler | |
| 5,963,626 A | 10/1999 | Nabkel | |
| 5,969,647 A | 10/1999 | Mou et al. | 341/55 |
| 5,970,127 A | 10/1999 | Smith et al. | 379/142 |
| 5,970,128 A | 10/1999 | Kim | 379/142 |
| 5,974,309 A | 10/1999 | Foti | |
| 5,982,866 A | 11/1999 | Kowalski | 379/127 |
| 5,991,377 A | 11/1999 | Malik | |
| 5,999,207 A | 12/1999 | Rodriguez et al. | |
| 5,999,599 A | 12/1999 | Shaffer et al. | |
| 5,999,613 A | 12/1999 | Nabkel et al. | |
| 6,006,087 A | 12/1999 | Amin | |
| 6,009,321 A | 12/1999 | Wang et al. | |
| 6,014,559 A | 1/2000 | Amin | |
| 6,016,512 A | 1/2000 | Huitema | |
| 6,021,188 A | 2/2000 | Meg | 379/142 |
| 6,021,427 A | 2/2000 | Spagna et al. | |
| 6,031,899 A | 2/2000 | Wu | |
| 6,044,148 A | 3/2000 | Bleile | 379/375 |
| 6,049,291 A | 4/2000 | Kikinis | |
| 6,058,171 A | 5/2000 | Hoopes | |
| 6,061,434 A | 5/2000 | Corbett | 379/93.35 |
| 6,061,566 A | 5/2000 | Friman | |
| 6,064,876 A | 5/2000 | Ishida et al. | |
| 6,065,844 A | 5/2000 | Chen | |
| 6,072,859 A | 6/2000 | Kong | |
| 6,078,581 A | 6/2000 | Shtivelman et al. | |
| 6,091,947 A | 7/2000 | Sumner et al. | |
| 6,094,478 A | 7/2000 | Shepherd et al. | |
| 6,094,573 A | 7/2000 | Heinonen et al. | |
| 6,094,574 A | 7/2000 | Vance et al. | |

| | | | | | | |
|---|---|---|---|---|---|---|
| 6,094,575 | A | 7/2000 | Anderson et al. | 6,366,772 B1 | 4/2002 | Arnson ........................ 455/415 |
| 6,101,246 | A | 8/2000 | Heinmiller et al. ......... 379/142 | 6,377,807 B1 | 4/2002 | Iparrea et al. |
| 6,104,784 | A | 8/2000 | Robbins | 6,377,979 B1 | 4/2002 | Yamashita et al. |
| 6,104,800 | A | 8/2000 | Benson | 6,389,124 B1 | 5/2002 | Schnarel et al. |
| 6,108,630 | A | 8/2000 | Kuechler et al. ........... 704/270 | 6,400,809 B1 | 6/2002 | Bossemeyer, Jr. et al. |
| 6,111,939 | A | 8/2000 | Brabanec .................... 379/142 | 6,400,947 B1 | 6/2002 | Bright et al. |
| 6,134,235 | A | 10/2000 | Goldman et al. | 6,404,868 B1 | 6/2002 | Beamish et al. |
| 6,134,311 | A | 10/2000 | Ekstrom | 6,404,875 B2 | 6/2002 | Malik et al. |
| 6,137,870 | A | 10/2000 | Scherer | 6,411,692 B1 | 6/2002 | Scherer .................. 379/127.01 |
| 6,137,871 | A | 10/2000 | Maier et al. ................. 379/142 | 6,421,425 B1 | 7/2002 | Bossi et al. .................... 379/52 |
| 6,141,341 | A | 10/2000 | Jones et al. | 6,422,263 B1 | 7/2002 | Spicer |
| 6,141,409 | A | 10/2000 | Madoch et al. | 6,427,003 B1 | 7/2002 | Corbett et al. ........... 379/93.35 |
| 6,144,644 | A | 11/2000 | Bajzath et al. .............. 370/259 | 6,427,064 B1 | 7/2002 | Henderson |
| 6,154,531 | A | 11/2000 | Clapper ....................... 379/142 | 6,434,394 B1 | 8/2002 | Grundvig et al. |
| 6,160,876 | A | 12/2000 | Moss et al. .................. 379/142 | 6,437,879 B1 | 8/2002 | Temple |
| 6,161,021 | A | 12/2000 | Akpa | 6,438,216 B1 | 8/2002 | Aktas |
| 6,163,595 | A | 12/2000 | Parker et al. | 6,438,217 B1 | 8/2002 | Huna |
| 6,163,691 | A | 12/2000 | Buettner et al. ............. 455/414 | 6,438,584 B1 | 8/2002 | Powers |
| 6,167,254 | A | 12/2000 | Chavez, Jr. et al. | 6,442,249 B1 | 8/2002 | Miller, Jr. |
| 6,169,911 | B1 | 1/2001 | Wagner et al. | 6,442,262 B1 | 8/2002 | Moss et al. ............. 379/142.02 |
| 6,173,049 | B1 | 1/2001 | Malik .......................... 379/207 | 6,442,263 B1 | 8/2002 | Beaton et al. |
| 6,178,232 | B1 | 1/2001 | Latter et al. .............. 379/88.21 | 6,442,283 B1 | 8/2002 | Tewfik et al. |
| 6,181,928 | B1 | 1/2001 | Moon | 6,445,781 B1 | 9/2002 | Heinmiller et al. ..... 379/142.01 |
| D437,879 | S | 2/2001 | Weinandt ..................... D18/50 | 6,449,351 B1 | 9/2002 | Moss et al. ............. 379/142.09 |
| 6,185,289 | B1 | 2/2001 | Hetz et al. ............... 379/221.08 | 6,449,361 B1 | 9/2002 | Okuda |
| 6,192,115 | B1 | 2/2001 | Toy et al. .................... 379/130 | 6,462,646 B2 | 10/2002 | Helferich |
| 6,192,116 | B1 | 2/2001 | Mayak | 6,466,653 B1 | 10/2002 | Hamrick et al. |
| 6,198,480 | B1 | 3/2001 | Cotugno et al. | 6,477,246 B1 | 11/2002 | Dolan et al. |
| 6,198,920 | B1 | 3/2001 | Doviak et al. | 6,480,589 B1 | 11/2002 | Lee et al. ............... 379/142.04 |
| 6,202,023 | B1 | 3/2001 | Hancock et al. ............. 701/201 | 6,483,898 B2 | 11/2002 | Lew et al. |
| 6,219,407 | B1 | 4/2001 | Kanevsky et al. ........ 379/88.02 | 6,493,430 B2 | 12/2002 | Leuca et al. ............. 379/88.12 |
| 6,222,826 | B1 | 4/2001 | Faynberg et al. | 6,493,431 B1 | 12/2002 | Troen-Krasnow et al. |
| 6,226,367 | B1 | 5/2001 | Smith et al. | 6,493,437 B1 | 12/2002 | Olshansky |
| 6,226,369 | B1 | 5/2001 | Lim et al. | 6,493,439 B2 | 12/2002 | Lung et al. ............. 379/142.01 |
| 6,226,399 | B1 | 5/2001 | Robinson | 6,494,953 B2 | 12/2002 | Hayes et al. |
| 6,230,006 | B1 | 5/2001 | Keenan et al. | 6,496,569 B2 | 12/2002 | Pelletier et al. .......... 379/88.21 |
| 6,233,325 | B1 | 5/2001 | Frech et al. | 6,496,571 B1 | 12/2002 | Wilson ..................... 379/93.23 |
| 6,236,975 | B1 | 5/2001 | Boe et al. | 6,496,692 B1 | 12/2002 | Shanahan |
| 6,243,448 | B1 | 6/2001 | Corbett et al. ........... 379/93.35 | 6,498,841 B2 | 12/2002 | Bull et al. ............... 379/142.08 |
| 6,243,461 | B1 | 6/2001 | Hwang ........................ 379/372 | 6,507,737 B1 | 1/2003 | Laham et al. |
| 6,252,952 | B1 | 6/2001 | Kung et al. | 6,529,500 B1 | 3/2003 | Pandharipande |
| 6,256,671 | B1 | 7/2001 | Strentzsch et al. | 6,529,591 B1 | 3/2003 | Dosani et al. ......... 379/106.03 |
| 6,262,987 | B1 | 7/2001 | Mogul | 6,532,490 B1 | 3/2003 | Lewis et al. |
| 6,266,399 | B1 | 7/2001 | Weller et al. ............. 379/88.19 | 6,539,080 B1 | 3/2003 | Bruce et al. ............. 379/88.17 |
| 6,278,704 | B1 | 8/2001 | Creamer et al. | 6,542,583 B1 | 4/2003 | Taylor ..................... 379/88.02 |
| 6,278,862 | B1 | 8/2001 | Henderson | 6,542,586 B1 | 4/2003 | Helstab |
| 6,282,275 | B1 * | 8/2001 | Gurbani et al. ........ 379/142.06 | 6,542,591 B1 | 4/2003 | Amro et al. ............ 379/142.01 |
| 6,292,479 | B1 | 9/2001 | Bartholomew et al. ..... 370/352 | 6,542,602 B1 | 4/2003 | Elazar |
| 6,292,549 | B1 | 9/2001 | Lung et al. ............. 379/142.01 | 6,542,812 B1 | 4/2003 | Obradovich et al. ........ 701/207 |
| 6,295,502 | B1 | 9/2001 | Hancock et al. ............ 701/201 | 6,546,092 B2 | 4/2003 | Corbett et al. ........... 379/93.35 |
| 6,301,342 | B1 | 10/2001 | Ander et al. | 6,549,621 B1 | 4/2003 | Christie, IV et al. |
| 6,301,350 | B1 | 10/2001 | Henningson et al. | 6,553,110 B1 | 4/2003 | Peng ...................... 379/210.03 |
| 6,304,644 | B2 | 10/2001 | Karnowski .................. 379/156 | 6,553,221 B2 | 4/2003 | Nakamura et al. |
| 6,310,943 | B1 | 10/2001 | Kowalski ............... 379/127.03 | 6,556,540 B1 | 4/2003 | Mawhinney et al. |
| 6,311,057 | B1 | 10/2001 | Barvesten | 6,560,317 B1 | 5/2003 | Quagliana ..................... 379/52 |
| 6,317,488 | B1 | 11/2001 | DePond et al. ........... 379/93.35 | 6,560,327 B1 | 5/2003 | McConnell |
| 6,317,781 | B1 | 11/2001 | De Boor et al. | 6,566,995 B2 | 5/2003 | Furuuchi et al. |
| 6,324,263 | B1 | 11/2001 | Sherwood et al. | 6,570,971 B1 | 5/2003 | Latter et al. ............. 379/142.01 |
| 6,324,271 | B1 | 11/2001 | Sawyer et al. .......... 379/142.05 | 6,570,974 B1 | 5/2003 | Gerszberg et al. ...... 379/218.01 |
| 6,327,347 | B1 | 12/2001 | Gutzmann | 6,574,319 B2 | 6/2003 | Latter et al. ............. 379/142.07 |
| 6,332,021 | B2 | 12/2001 | Latter et al. ............. 379/142.01 | 6,580,904 B2 | 6/2003 | Cox et al. |
| 6,333,973 | B1 | 12/2001 | Smith et al. | 6,584,490 B1 | 6/2003 | Schuster et al. |
| 6,337,979 | B1 | 1/2002 | Nakayasu | 6,587,458 B1 * | 7/2003 | Burg et al. ................... 370/356 |
| 6,339,639 | B1 | 1/2002 | Henderson ............. 379/142.08 | 6,590,970 B1 | 7/2003 | Cai et al. |
| 6,341,161 | B1 | 1/2002 | Latter et al. ............. 379/142.01 | 6,597,905 B1 | 7/2003 | Hijii |
| 6,345,187 | B1 | 2/2002 | Berthoud et al. ........... 455/462 | 6,603,840 B2 * | 8/2003 | Fellingham et al. ...... 379/93.23 |
| 6,347,136 | B1 | 2/2002 | Horan | 6,608,891 B1 | 8/2003 | Pelletier et al. |
| 6,351,637 | B1 | 2/2002 | Lee ............................. 455/415 | 6,618,474 B1 | 9/2003 | Reese |
| 6,353,664 | B1 | 3/2002 | Cannon et al. ........... 379/142.1 | 6,625,595 B1 | 9/2003 | Anderson et al. ............... 707/3 |
| 6,361,637 | B2 | 3/2002 | Martin et al. | 6,631,181 B1 | 10/2003 | Bates et al. ............... 379/88.18 |
| 6,363,140 | B1 | 3/2002 | Pinard | 6,633,633 B1 | 10/2003 | Bedingfield |
| 6,363,411 | B1 | 3/2002 | Dugan et al. | 6,639,979 B1 | 10/2003 | Kim ......................... 379/142.06 |
| 6,366,661 | B1 | 4/2002 | Devillier et al. ........ 379/211.01 | 6,650,743 B2 | 11/2003 | Heinmiller et al. ..... 379/142.01 |

| | | |
|---|---|---|
| 6,659,597 B2 | 12/2003 | Murata et al. |
| 6,661,785 B1 | 12/2003 | Zhang et al. ............... 370/352 |
| 6,665,388 B2 | 12/2003 | Bedingfield |
| 6,683,870 B1 | 1/2004 | Archer |
| 6,687,341 B1 | 2/2004 | Koch et al. ............... 379/88.17 |
| 6,701,160 B1 | 3/2004 | Pinder et al. |
| 6,718,021 B2 | 4/2004 | Crockett et al. ......... 379/93.23 |
| 6,721,407 B1 | 4/2004 | Michelena |
| 6,724,872 B1 | 4/2004 | Moore et al. ............ 379/93.35 |
| 6,725,872 B2 | 4/2004 | Kindell et al. |
| 6,728,355 B2 | 4/2004 | Kowalski ................ 379/142.06 |
| 6,728,360 B1 | 4/2004 | Brennan |
| 6,728,365 B1 | 4/2004 | Li et al. |
| 6,731,727 B2 | 5/2004 | Corbett et al. ........... 379/93.35 |
| 6,732,188 B1 | 5/2004 | Flockhart et al. ........... 709/245 |
| 6,738,615 B1 | 5/2004 | Chow et al. |
| 6,748,058 B1 | 6/2004 | Schwend et al. ........ 379/88.21 |
| 6,748,068 B1 | 6/2004 | Walsh et al. ............ 379/142.03 |
| 6,757,274 B1 | 6/2004 | Bedingfield et al. ........ 370/352 |
| 6,757,530 B2 | 6/2004 | Rouse et al. |
| 6,757,740 B1 | 6/2004 | Parekh et al. ................ 709/245 |
| 6,765,998 B2 | 7/2004 | Bruce et al. ............. 379/88.18 |
| 6,766,003 B2 | 7/2004 | Moss et al. ............ 379/142.01 |
| 6,768,792 B2 | 7/2004 | Brown et al. |
| D494,953 S | 8/2004 | Leung .................... D14/141.3 |
| 6,771,754 B2 | 8/2004 | Pelletier et al. ........ 379/142.01 |
| 6,771,755 B1 | 8/2004 | Simpson ................ 379/142.04 |
| 6,771,956 B1 | 8/2004 | Beeler |
| 6,775,366 B1* | 8/2004 | Cobbett et al. ......... 379/201.02 |
| 6,775,540 B2 | 8/2004 | Iyer |
| 6,778,524 B1 | 8/2004 | Augart ....................... 370/351 |
| 6,779,020 B1 | 8/2004 | Henrick |
| 6,785,301 B1 | 8/2004 | Chapman et al. ........... 370/522 |
| 6,785,368 B1 | 8/2004 | Eason et al. ............. 379/88.19 |
| 6,785,540 B1 | 8/2004 | Wichelman |
| 6,792,266 B1* | 9/2004 | Masuda et al. .............. 455/417 |
| 6,798,841 B2 | 9/2004 | Hansen |
| 6,798,879 B1 | 9/2004 | Beham |
| 6,804,503 B2 | 10/2004 | Shohara et al. |
| 6,807,267 B2 | 10/2004 | Moss et al. ............ 379/207.15 |
| 6,810,077 B1 | 10/2004 | Dezonno .................... 375/222 |
| 6,810,115 B2 | 10/2004 | Fukuda .................. 379/142.01 |
| 6,813,344 B1 | 11/2004 | Lemke ................... 379/142.06 |
| 6,816,481 B1 | 11/2004 | Adams et al. ............... 370/352 |
| 6,818,474 B2 | 11/2004 | Kim et al. |
| 6,826,271 B1 | 11/2004 | Kanabar et al. ........ 379/212.01 |
| 6,830,595 B2 | 12/2004 | Reynolds, III |
| 6,831,974 B1 | 12/2004 | Watson et al. ......... 379/265.02 |
| 6,842,512 B2 | 1/2005 | Pedersen |
| 6,845,151 B2 | 1/2005 | Peng ..................... 379/142.06 |
| 6,845,512 B2 | 1/2005 | Horng et al. |
| 6,853,710 B2 | 2/2005 | Harris |
| 6,853,711 B2 | 2/2005 | Brisebois et al. |
| 6,856,677 B2 | 2/2005 | Leijonhufvud |
| 6,859,527 B1 | 2/2005 | Banks et al. |
| 6,865,266 B1 | 3/2005 | Pershan ................. 379/221.13 |
| 6,865,384 B2 | 3/2005 | Sagi et al. |
| 6,868,155 B1 | 3/2005 | Cannon et al. |
| 6,888,927 B1* | 5/2005 | Cruickshank et al. .... 379/88.11 |
| 6,888,972 B2 | 5/2005 | Berg et al. |
| 6,898,275 B2 | 5/2005 | Dolan et al. ............ 379/211.02 |
| 6,904,276 B1 | 6/2005 | Freeman et al. |
| 6,907,034 B1 | 6/2005 | Begis |
| 6,909,777 B2 | 6/2005 | Latter et al. |
| 6,914,953 B2 | 7/2005 | Boerstler |
| 6,922,411 B1 | 7/2005 | Taylor |
| 6,928,154 B1* | 8/2005 | Cheaito et al. ........ 379/207.15 |
| 6,931,007 B2* | 8/2005 | Jones ........................ 370/392 |
| 6,947,531 B1 | 9/2005 | Lewis et al. |
| 6,952,469 B2 | 10/2005 | Han |
| 6,970,546 B2 | 11/2005 | Kent, Jr. et al. |
| 6,977,993 B2 | 12/2005 | Starbuck et al. |
| 6,996,211 B2 | 2/2006 | Reynolds et al. |
| 7,012,999 B2 | 3/2006 | Ruckart |
| 7,016,482 B2 | 3/2006 | Moss et al. |
| 7,020,250 B2 | 3/2006 | Lew et al. |
| 7,027,408 B2 | 4/2006 | Nabkel et al. |
| 7,027,569 B2 | 4/2006 | Price |
| 7,076,051 B2 | 7/2006 | Brown et al. |
| 7,079,837 B1 | 7/2006 | Sherman et al. |
| 7,085,358 B2 | 8/2006 | Ruckart |
| 7,095,715 B2 | 8/2006 | Buckman et al. |
| 7,103,167 B2 | 9/2006 | Brahm et al. |
| 7,107,077 B2 | 9/2006 | Lee |
| 7,113,577 B2* | 9/2006 | Cook et al. ............ 379/142.01 |
| 7,127,488 B1 | 10/2006 | Scott et al. |
| 7,139,374 B1 | 11/2006 | Scott et al. |
| 7,152,118 B2 | 12/2006 | Anderson, IV et al. |
| 7,155,211 B2 | 12/2006 | Mun et al. |
| 7,228,129 B1 | 6/2007 | Ward et al. |
| 2001/0002209 A1 | 5/2001 | Han |
| 2001/0005854 A1 | 6/2001 | Murata et al. ............... 709/206 |
| 2001/0044898 A1 | 11/2001 | Benussi et al. |
| 2001/0048737 A1 | 12/2001 | Goldberg et al. |
| 2002/0009184 A1 | 1/2002 | Shnier |
| 2002/0016748 A1 | 2/2002 | Emodi et al. ................. 705/26 |
| 2002/0041605 A1 | 4/2002 | Benussi et al. |
| 2002/0055926 A1 | 5/2002 | Dan et al. .................... 707/100 |
| 2002/0067816 A1* | 6/2002 | Bushnell ................ 379/201.02 |
| 2002/0077102 A1 | 6/2002 | Achuthan et al. |
| 2002/0082050 A1 | 6/2002 | Mountney et al. |
| 2002/0085687 A1 | 7/2002 | Contractor et al. |
| 2002/0118812 A1 | 8/2002 | Contractor |
| 2002/0119430 A1 | 8/2002 | Szynalski .................... 434/219 |
| 2002/0120629 A1 | 8/2002 | Leonard ...................... 707/100 |
| 2002/0122401 A1 | 9/2002 | Xiang et al. |
| 2002/0125929 A1 | 9/2002 | Chen et al. |
| 2002/0183098 A1 | 12/2002 | Lee et al. |
| 2002/0188443 A1 | 12/2002 | Reddy et al. |
| 2002/0197991 A1 | 12/2002 | Anvekar et al. |
| 2003/0007620 A1 | 1/2003 | Elsey et al. ............. 379/218.01 |
| 2003/0012353 A1 | 1/2003 | Tang et al. |
| 2003/0016143 A1 | 1/2003 | Ghazarian |
| 2003/0016800 A1 | 1/2003 | Fukuda |
| 2003/0026416 A1 | 2/2003 | Fusco |
| 2003/0031169 A1* | 2/2003 | Emerson ..................... 370/352 |
| 2003/0032414 A1 | 2/2003 | Melaku et al. |
| 2003/0050100 A1 | 3/2003 | Dent |
| 2003/0053602 A1 | 3/2003 | Stuckman et al. |
| 2003/0063730 A1 | 4/2003 | Woodring |
| 2003/0063731 A1 | 4/2003 | Woodring |
| 2003/0068020 A1 | 4/2003 | Hamrick et al. |
| 2003/0092384 A1 | 5/2003 | Ross, III |
| 2003/0092432 A1 | 5/2003 | Hwang |
| 2003/0095650 A1 | 5/2003 | Mize |
| 2003/0112938 A1 | 6/2003 | Kanakubo et al. |
| 2003/0133553 A1 | 7/2003 | Khakoo et al. ........ 379/142.01 |
| 2003/0133653 A1 | 7/2003 | De Barros et al. |
| 2003/0135626 A1 | 7/2003 | Ray et al. .................... 709/228 |
| 2003/0148758 A1 | 8/2003 | McMullin |
| 2003/0152207 A1* | 8/2003 | Ryan ..................... 379/201.04 |
| 2003/0187949 A1 | 10/2003 | Bhatt et al. .................. 709/218 |
| 2003/0196206 A1 | 10/2003 | Shusman ....................... 725/91 |
| 2003/0198322 A1 | 10/2003 | White, Jr. |
| 2003/0215078 A1 | 11/2003 | Brahm et al. ........... 379/211.02 |
| 2003/0219107 A1 | 11/2003 | Richardson et al. |
| 2004/0049545 A1 | 3/2004 | Lockridge et al. |
| 2004/0101118 A1 | 5/2004 | Powell |
| 2004/0101124 A1 | 5/2004 | Koch et al. |
| 2004/0109558 A1 | 6/2004 | Koch |
| 2004/0114730 A1* | 6/2004 | Koch et al. ..................... 379/9 |
| 2004/0120100 A1 | 6/2004 | Reynolds et al. .......... 379/88.19 |
| 2004/0120475 A1 | 6/2004 | Bauer et al. |
| 2004/0125929 A1 | 7/2004 | Pope |
| 2004/0171370 A1 | 9/2004 | Natarajan |
| 2004/0181587 A1 | 9/2004 | Cao et al. |

| | | |
|---|---|---|
| 2004/0192332 A1 | 9/2004 | Samn .................. 455/456.1 |
| 2004/0202298 A1 | 10/2004 | Lopez et al. |
| 2004/0202299 A1* | 10/2004 | Schwartz .............. 379/142.01 |
| 2004/0208301 A1 | 10/2004 | Urban et al. |
| 2004/0208302 A1 | 10/2004 | Urban et al. |
| 2004/0209604 A1 | 10/2004 | Urban et al. |
| 2004/0209605 A1 | 10/2004 | Urban et al. |
| 2004/0209640 A1 | 10/2004 | Urban et al. |
| 2004/0233892 A1 | 11/2004 | Roberts et al. |
| 2004/0242212 A1 | 12/2004 | Bacon et al. |
| 2004/0248560 A1 | 12/2004 | Bedingfield, Sr. |
| 2005/0073999 A1 | 4/2005 | Koch |
| 2005/0100158 A1 | 5/2005 | Kreiner et al. |
| 2005/0107074 A1 | 5/2005 | Zellner |
| 2005/0147228 A1 | 7/2005 | Perrella et al. |
| 2006/0002540 A1 | 1/2006 | Kreiner et al. |
| 2006/0013375 A1 | 1/2006 | Smith et al. |
| 2006/0029209 A1 | 2/2006 | Moton et al. |
| 2006/0152207 A1 | 7/2006 | Riebel et al. |
| 2006/0153173 A1 | 7/2006 | Beck et al. |
| 2006/0227957 A1* | 10/2006 | Dolan et al. ........... 379/212.01 |
| 2007/0064911 A1 | 3/2007 | Bedingfield, Sr. et al. |

FOREIGN PATENT DOCUMENTS

| | | |
|---|---|---|
| KR | 2002014945 | 2/2002 |
| WO | 97/50225 | 12/1997 |
| WO | 03/030501 A1 | 4/2003 |
| WO | 03/030502 A1 | 4/2003 |
| WO | 03/090432 A1 | 10/2003 |

OTHER PUBLICATIONS

Handley et al., "SIP: Session Initiation Protocol", Mar. 1999, pp. 1-112.
Egevang, et al., "The IP Network Address Translator (NAT)", May 1994, pp. 1-8.
AASTRA Telecom, Press Release, Aastra Telecom Introduces CNX Conference Bridge, Aug. 29, 2005, 1 page.
Bellcore Specification TR-NWT-000310, Calling Number Delivery, Issue 4, Dec. 1992.
Bellcore Specification TR-NWT-001188, Calling Number Delivery Generic Requirements, Issue 1, Dec. 1991.
T. Farley et al.; "Cellular Telephone Basics: AMPS & Beyond;" [online]; [retrieved on Mar. 6, 2003]; retrieved from the Internet http://www.privateline.com/Cellbasics/Cellbasics.html.
J. Boswell, G. Lingenauber, An Advanced HF Receiver Design, Jul. 1994, IEE, Conference Publication. No. 392, pp. 41-47.
Mark H. Norris, Transmitter Architectures, 1998, IEE, pp. 4/1-4/6.
OKI Silicon Solutions Company, Japan Site, "Multi-Lingual Text-to-Speech Processor ML2110;" [online]; [retrieved on Aug. 31, 2005] retrieved from the Internet http://www.//oki.com/semi/English/m12110/htm.
RBS 884 Pico System Description, Author Unknown, Ericsson 1/1551-AE/LZB 119 2269 Uae Rev A, Apr. 23, 1998.
Slawson, "Caller ID Basics;" [online]; [retrieved on Oct. 31, 2001]; retrieved from the Internet http://www.testmark.com/develop/tml_callerid_cnt.html.
SmartHome "The Caller ID System thats Speaks for Itself!;" [online]; [retrieved on Aug. 31, 2005]; retrieved from the Internet http://www.smarthome.com/5154.html.
SmartHome "The Caller ID System that SPEAKS of Itself! Talking Caller ID;" [online]; [retrieved on Nov. 5, 2001]; retrieved from the Internet http://www.smarthome.com/5154.html.
"Talking Caller ID by Stealth Software;" [online]; [retrieved on Nov. 5, 2001]; retrieved from the Internet http://www.talkingcallerid.com/.
"Time Division Multiple Access (TDMA);" [online]; [retrieved on Mar. 6, 2003]; retrieved from the Internet http://www.iec.org/online/tutorials/tdma/.
"Venture IP Telephone System" AASTRA [online]; [retrieved on Aug. 31, 2001]; retrieved from the Internet http://www.aastra.com/products/callerids/voicecallerid/be-6060.html.
"Venture IP Telephone System" AASTRA; [online]; [retrieved on Nov. 5, 2001]; retrieved from the Internet http://www.aastra.com/products/callerids/voicecallerid/be-6090.html.
"Voice-9090 Talking Caller ID", Aastra Telecom-Talking Caller-ID-Voice 9090, [online]; [retrieved on Nov. 5, 2001]; http://www.aastra.com/products/callerids/voicecallerid/be-9090.html.
International Search Report PCT/US02/30068, Dec. 9, 2002.
International Search Report PCT/US02/29988, Sep. 23, 2002.
U.S. Appl. No. 10/032,724, filed Dec. 27, 2001, Harold et al.
U.S. Appl. No. 10/200,906, filed Jul. 23, 2002, Scott et al.
U.S. Appl. No. 10/144,555, filed May 13, 2002, Koch et al.
U.S. Appl. No. 10/144,556, filed May 13, 2002, Koch et al.
U.S. Appl. No. 10/152,544, filed May 21, 2002, Alston et al.
U.S. Appl. No. 10/200,874, filed Jul. 23, 2002, Scott et al.
U.S. Appl. No. 09/812,338, filed Mar. 19, 2001, Smith.

* cited by examiner

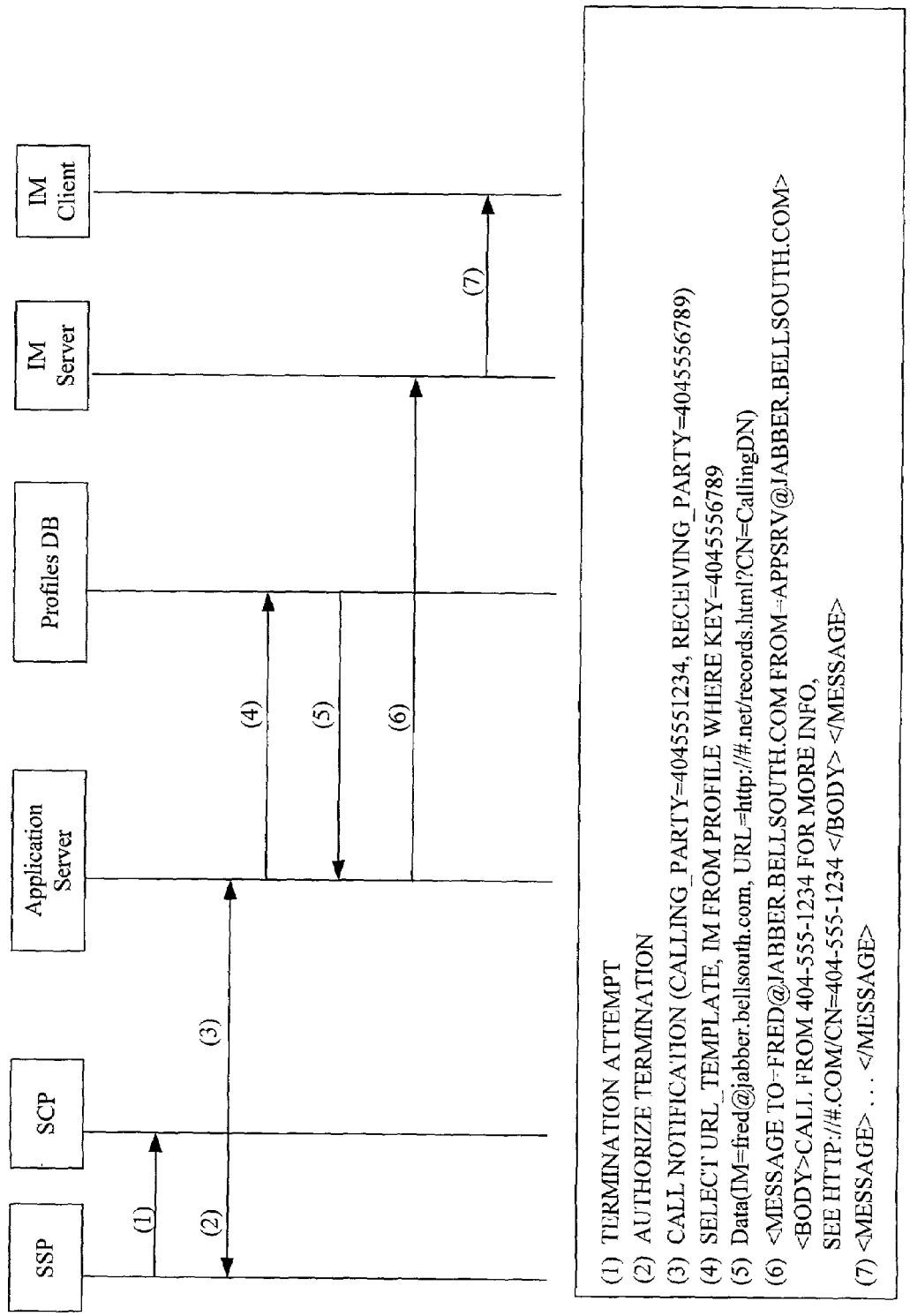

INTERNET CALLER-ID INTEGRATION

TECHNICAL FIELD

The present invention is generally related to communications, and more particularly, to the supplying of visual information concerning a telephone caller to the recipient of a telephone call.

BACKGROUND OF THE INVENTION

Caller-ID is a telephone service that provides, for subscribers of the service, identification information about a telephone caller. This information typically appears on a display of a telephone or on a separate small display device of the subscriber, as the call is being received. In signal system 7 (SS7) systems, caller-ID information is transmitted on the subscriber loop using frequency shift keyed (FSK) modem tones. The FSK modem tones are used to transmit the display message in American Standard Code for Information Interchange (ASCII) character code form, where the transmission on the display message takes place between the first and second ring. Standard caller-ID information includes the date, time, and calling number, and sometimes, the name associated with the calling number. However, today's caller-ID devices are limited by the amount of information about the calling party that can be transmitted and displayed to the called party over conventional telephone systems.

Although telephones have traditionally been "always on," meaning that they are generally continuously able to receive a call over the telephone network, data communications involving the Internet often were not. Customarily, a person connected to the Internet once used a dial-up service and a computer linked to a phone line via a modem. In establishing dial-up service, the user made a call to an Internet service provider (ISP), where the eventual Internet connection was only active during the duration of a telephone call. However, recent technologies, such as digital subscriber line (DSL) communication, cable modem communication, and satellite communication enable computers and other Internet devices to be "always-on" for data communications at the same time that telephones are "always-on" for voice communications. Standard DSL service works by connecting a DSL modem on each end of a twisted pair telephone line. The DSL modems create separate voice and data channels, by sending data communications over a different part of the frequency spectrum than analog voice signals. Thus, DSL allows for voice and data communications to occur simultaneously over the same phone line. Consequently, a user may converse over a telephone to his friend, while the user is also emailing a message over the Internet to a family member.

The counterpart to DSL is cable modem technology and Internet satellite communications. Both cable modems and satellites are further ways to engender simultaneous data and voice communications over separate communication mediums. In cable modem technology, data communications are sent over a local cable TV line at the same time that a telephone can send voice communications over a phone line. Correspondingly, for Internet satellite communications, data signals are transmitted to and from the Internet using satellites, leaving phone lines free for voice communications.

With the influx of "always-on" technology, especially with data communication concerns, technologies have been developed that seek out users. Unlike standard email and web applications, which pull information from the Internet that is requested by a user, recent applications push information to a user. "Pushing" describes technologies that send recipients specific material. Additionally, instant messaging is another technology, where information is sent to a user without necessarily being stored on a server, in some implementations. In instant messaging, the messages created by a sender are delivered to a recipient in almost "instant" time. Even during peak Internet usage periods, the delay is rarely more than a second or two.

At the time of the present application, "always-on" usage accounts for over fifty percent of the total online Internet population. Therefore, it is becoming commonplace to be connected to the Internet at the same time that a telephone is also connected to a telephone network. Unfortunately, the conventional caller-ID service has not expanded in functionality as Internet connection times have increased. Therefore, there is a need for improved systems and methods that address the aforementioned deficiencies and inadequacies.

SUMMARY OF THE INVENTION

One preferred embodiment of the present invention provides a system and method for supplying calling party information to a receiving party having an Internet-connected device. Briefly described, in architecture, one embodiment of the system, among others, can be implemented as follows. The system includes an Internet caller-ID system configured to detect if a telephone call to a receiving party is designated for Internet caller-ID service. If Internet caller-ID service is designated, the caller-ID system generates and sends an Internet caller-ID message to the receiving party.

One preferred embodiment of the present invention can also be viewed as providing methods for supplying calling party information to a receiving party having an Internet-connected device coupled to the Internet, wherein a calling party places a telephone call to a receiving party over a telephone network. One embodiment of the present invention is a method with the following steps. During the routing of a telephone call from the calling party to the receiving party, an Internet caller-ID service is detected for the receiving party. Routing of the call is suspended while an Internet caller-ID message is generated and sent to the receiving party, and then the routing of the telephone call is continued. Alternatively, the Internet caller-ID message may be sent to the receiving party without suspending routing of the call. In this regard, one embodiment of such a method, among others, can further include the following steps: placing a resource locator designated by the calling party in the Internet caller-ID; receiving the Internet caller-ID message; and activating the resource locator contained in the Internet caller-ID message.

Other systems, methods, features, and advantages of the present invention will be or become apparent to one with skill in the art upon examination of the following drawings and detailed description. It is intended that all such additional systems, methods, features, and advantages be included within this description and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 5 is a diagram of the service flow of an embodiment of an Internet caller-ID system where the receiving party provides a resource locator according to the present invention.

DETAILED DESCRIPTION OF THE PREFERRED EMBODIMENTS

One preferred embodiment of the present invention provides a communication system and method, wherein during the time a caller or calling party is initiating a telephone call to a receiving party, an Internet caller-ID system is activated. The Internet caller-ID system notifies the receiving party of the identification of the calling party by an Internet caller-ID message. The Internet caller-ID message is delivered to an Internet-connected device of the receiving party, while the call is being completed over a telephone network. The telephone network may be a standard PSTN network or could be another telephone network such as voice over Internet protocol (VoIP).

A. Architecture

Figure 1A:
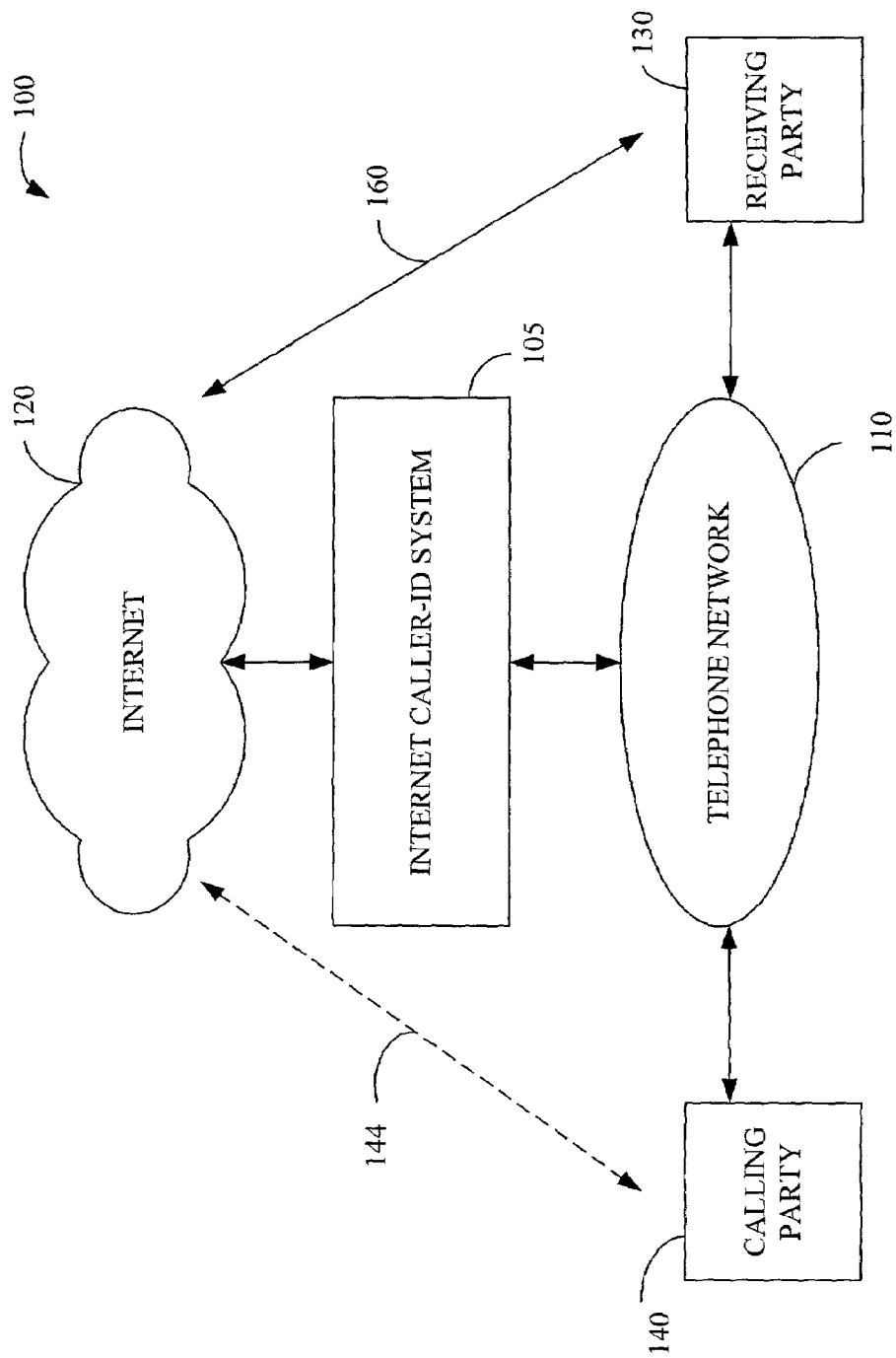
FIG. 1A is a block diagram of one embodiment of a communication system of the present invention.

FIG. 1A is a block diagram showing one preferred embodiment of a communication system 100 of the present invention. The system 100 includes an Internet caller-ID system 105, a telephone network 110, and the Internet 120. A communication station 130 of a receiving party is connected to the telephone network 110 and has an associated Internet access 160. Correspondingly, a communication station 140 of a calling party is also included in the communication system 100. The communication station 140 is connected to the telephone network 110, and it may have Internet access 144. Note, that although separation is suggested in FIG. 1A, discrete functions of the Internet-caller ID system 105 can be viewed as being performed by devices that are implemented in other elements, such as the telephone network 110 and by devices that are in implemented in the Internet 120, without limitations. Further, the Internet-caller ID system 105 can be implemented in software, firmware, hardware, or a combination thereof.

Figure 1B:
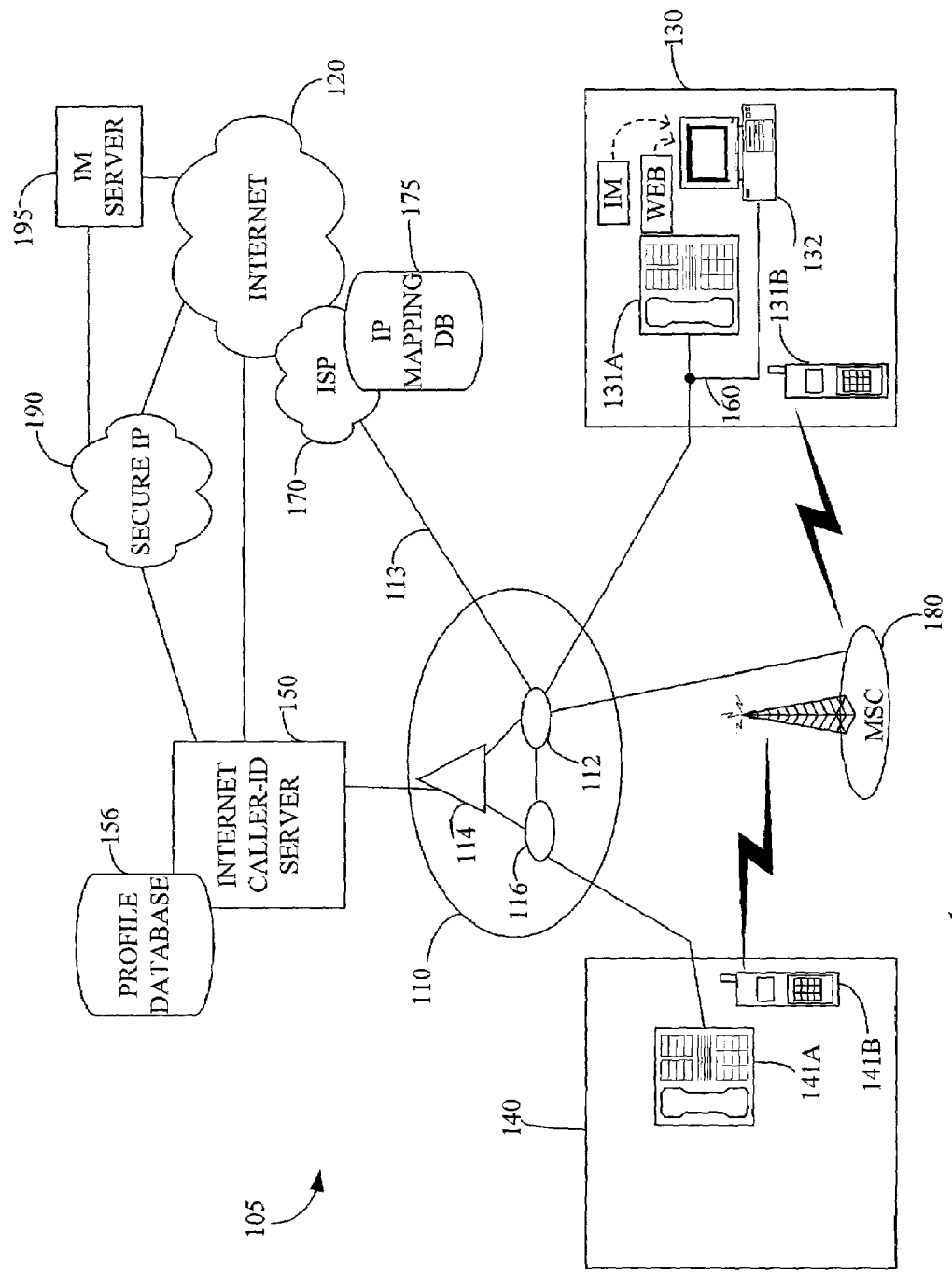
FIG. 1B is a more detailed diagram of the communication system of FIG. 1A.

FIG. 1B is a more detailed diagram of the communication system 100 of FIG. 1. Here, the Internet caller-ID system 105 includes telephone network switch 112, 116, a service control point (SCP) 114, and an Internet caller-ID server 150 with an associated profile database 156. The communication station of a receiving party 130 is shown connected to the telephone network switch 112 through connection 113, which provides access to the telephone network 110. The communication station of the receiving party may also have access to an Internet network 120 through an Internet service provider (ISP) 170. The communication station of a calling party 140 is connected to a telephone network switch 116.

The communication station of the receiving party 130 contains a telephony device connected to the telephone network and an Internet-connected device 132 that is connected to the Internet 120. Possible telephony devices include, among others, a telephone 131A attached to a telephone line from the telephone network or a wireless cellular telephone 131B communicating to the telephone network through a mobile switching center 180. The Internet-connected device 132 includes a device for communicating on the Internet 120, such as a computer with Internet capabilities. The Internet-connected device 132 may be connected to the Internet 120 by a variety of manners 160. For example, the Internet-connected device 132 may be connected to a standard modem that converts data signals to voice signals and transmits the converted signals over the telephone line to the ISP 170 that has Internet access. In this sort of setup, however, the telephony device 131A and the Internet-connected device 132 would not be able to both be sending communication signals over one telephone line at the same time. Thus, both could not be "always-on," unless a second telephone line was utilized Another manner for the Internet-connected device 132 to be "always-on" connected to the Internet 120 is for the Internet-connected device 132 to be connected to (or include) a DSL modem which allows the Internet-connected device 132 and the telephony device 131A to both communicate over a telephone line at the same time, so that both the telephony device 131A and the Internet-connected device 132 can be "always-on." Also, the Internet-connected device 132 could be independently connected to the Internet 120 without the use of a telephone network phone line, by using a cable modem or by using satellite communications, as would be understood by one reasonably skilled in the art. Again then, simultaneous communications over the telephony device 131A and the Internet-connected device 132 would be possible.

The communication station of the calling party 140 includes a telephony device coupled to a telephone network switch 116, where the telephony device 141 may be a telephone 141A attached to a telephone line or a wireless cellular phone 141B communicating with the telephone network 110 through a mobile switching center 180.

The telephone network 110 provides telephone communication services and may be, among others, an analog PSTN network or a digital network, such as VoIP. The telephone network 110 features switches, such as switches 112, 116, within the network 110 which connect and route calls between the parties in a telephone conversation, such as between the calling party 140 and the receiving party 130. Also featured in the telephone network 110, a service control point 114 communicates with the switch 112, 116 and other devices, which may be located outside of the telephone network 110, in order to provide requested telephone services. The service control point 114 is a processing element capable of executing service logic.

Specifically, the Internet caller-ID server 150 communicates with the service control point 114 and the Internet 120 in order to provide Internet caller-ID service to users. In order to provide this service, other network devices such as an IP mapping database 175 that is provided by a ISP 170, and a profile database 156 communicating with the Internet caller-ID server 150 are employed. Further, an instant messaging server 195 may be utilized in the communication system 100, where the instant messaging server is connected to the Internet 120. These Internet connections and others throughout the communication system 100 may be protected by a secure IP network 190, as would be understood by one reasonably skilled in the art.

B. Operation

The overall operation of the communication system 100 will be described with reference to FIG. 2 and FIGS. 2A-2H, which depict the functionality of a preferred implementation of the Internet caller-ID system 100. It should be noted that, in some alternative implementations, the functions noted in the various blocks may occur out of the order depicted in the figures. For example, two blocks shown in succession in the figures may, in fact, be executed substantially concurrently or the blocks may be executed in reverse order depending upon the functionality involved.

Figure 2:
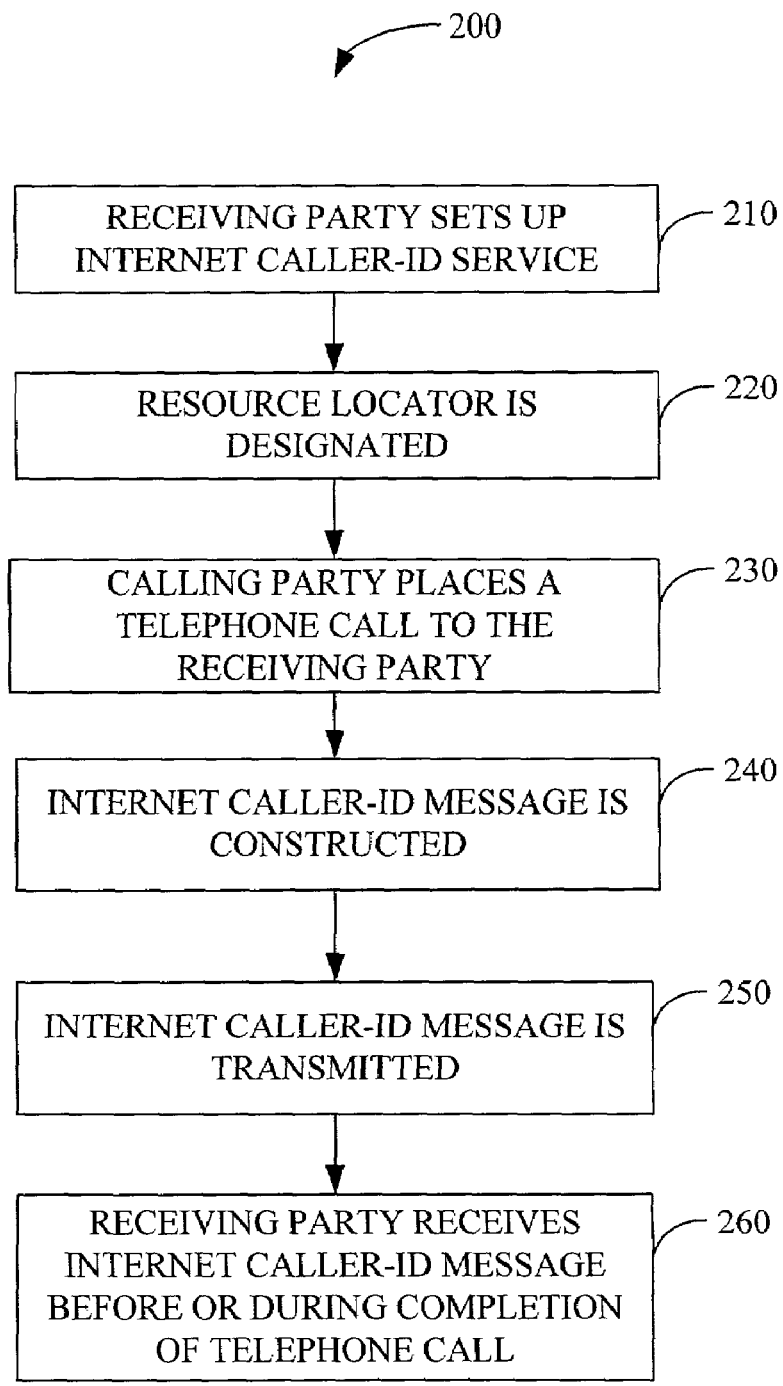
FIG. 2 is a flowchart of one preferred embodiment of a method for sending and receiving Internet caller-ID messages over the Internet.

Referring now to the flowchart of FIG. 2, one preferred embodiment of the present invention includes a method 200 for sending and receiving caller-ID messages over the Internet. The process 200 involves a receiving party setting up Internet caller-ID service, as shown in block 210. In block 220, a resource locator is designated by a receiving party 130, a calling party 140, or a third party. In block 230, the calling party 140 places a telephone call to the receiving party 130. Then in block 240, an Internet caller-ID message is constructed, and transmitted to the receiving party 130, as shown in block 250. Accordingly in block 260, the receiving party 130 receives the Internet caller-ID message before or during the completion of the telephone call from the calling party 140 to the receiving party 130.

1. Setup

Figure 2A:
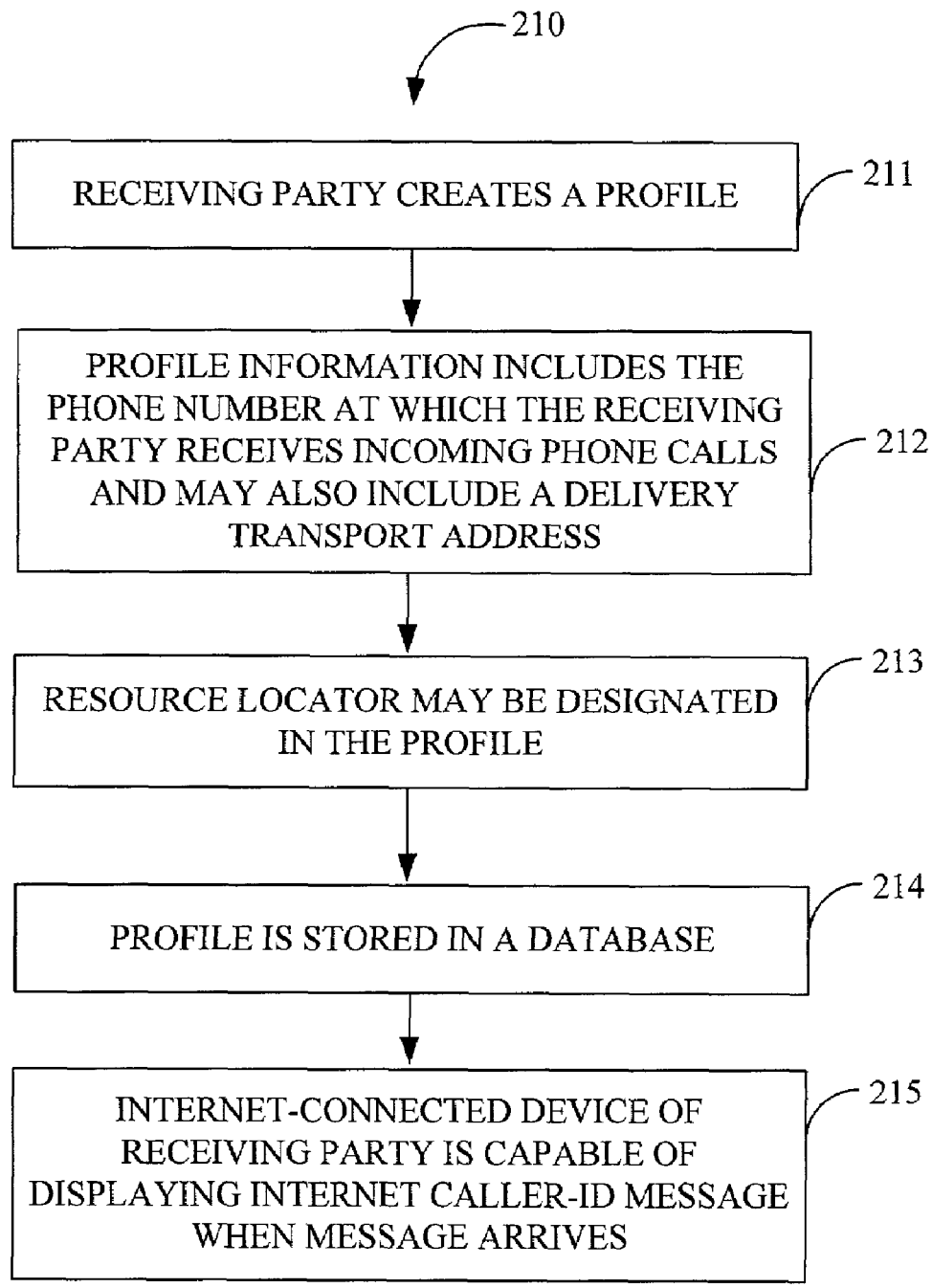
FIG. 2A is a flowchart describing an embodiment of the setup process in FIG. 2.

The operation of the setup process for an implementation of the Internet caller-ID system 105 will be described with reference to FIG. 2A. When a user, such as the receiving party 130, desires to register for the Internet caller-ID service, so that he or she may receive Internet caller-ID messages, the receiving party 130 first creates a profile, as shown in block 211. The creation of the profile can occur, for example, during a registration session for the Internet caller-ID service, where the receiving party 130 provides the information contained in the profile during an Internet session, such as through interaction with various form web pages generated by the Internet caller-ID server 150, a telephone call, or an interview with a person who would later enter the information into the profile.

In block 212, the information gathered for the profile includes the phone number at which the communication station of the receiving party 130 receives incoming phone calls. This phone number may be the phone number of a telephone 131A attached to a phone line, or it may be even a wireless telephone 131B that the receiving party also uses at the communication station 131, among others. Since multiple telephony devices 131 may be used to receive incoming phone calls, multiple phone numbers may be listed in the profile information for the receiving party 130. As depicted in block 212, the profile also contains the receiving party's 130 delivery transport address and any other information that is needed to deliver, over the Internet, the Internet caller-ID message to the Internet-connected device 132 of the receiving party. The delivery transport address is discussed in more detail later.

In block 213, a resource locator is designated. A resource locator is an address location for a document or media that is included in an Internet caller-ID message. Upon receipt, the receiving party's Internet-connected device 132 can retrieve the document specified by the resource locator. Note, the receiving party 130 may receive Internet caller-ID messages regardless of whether the calling party 140 has registered for the Internet caller-ID service or not. However, if the calling party 140 has registered for the Internet caller-ID service, then the calling party 140 may have the capability of designating a resource locator that is contained in the Internet caller-ID message.

For example, this resource locator could be a URL address for a personal web page of the calling party 140 that contains pictures that the calling party 140 wishes for the receiving party 130 to view. Also as part of the calling party's profile, the calling party 140 may provide additional information such as the calling party's name, address, and any other information that can be placed in the Internet caller-ID message. The profiles are stored on a profile database 156. The profile database 156 is connected to or stored as part of the Internet caller-ID server 150, as shown in block 214.

If the calling party 140 does not designate a resource locator, or if the calling party 140 is not registered with the Internet caller-ID service, then a default resource locator, such as the calling party's entry in the white or yellow pages, may be selected as the resource locator. It is also contemplated that the receiving party 130 may designate a resource locator that is contained in the Internet caller-ID message, or a third party who is not a participant in the telephone communication may designate a resource locator. These steps and features are discussed subsequently herein.

The Internet-connected device 132 of the receiving party should have the capability of displaying the Internet message being sent as soon as it arrives. Therefore in block 215, the Internet-connected device 132 is set to be able to receive messages. For example, if the Internet caller-ID message is in the form of a web page, the Internet-connected device 132 should have a web browser installed and active on the Internet-connected device. Likewise, if the message is in the form of an instant message, the Internet-connected device 132 should have an instant message client loaded and actively running on the Internet-connected device 132.

2. Designating the Resource Locator

Figure 2B:
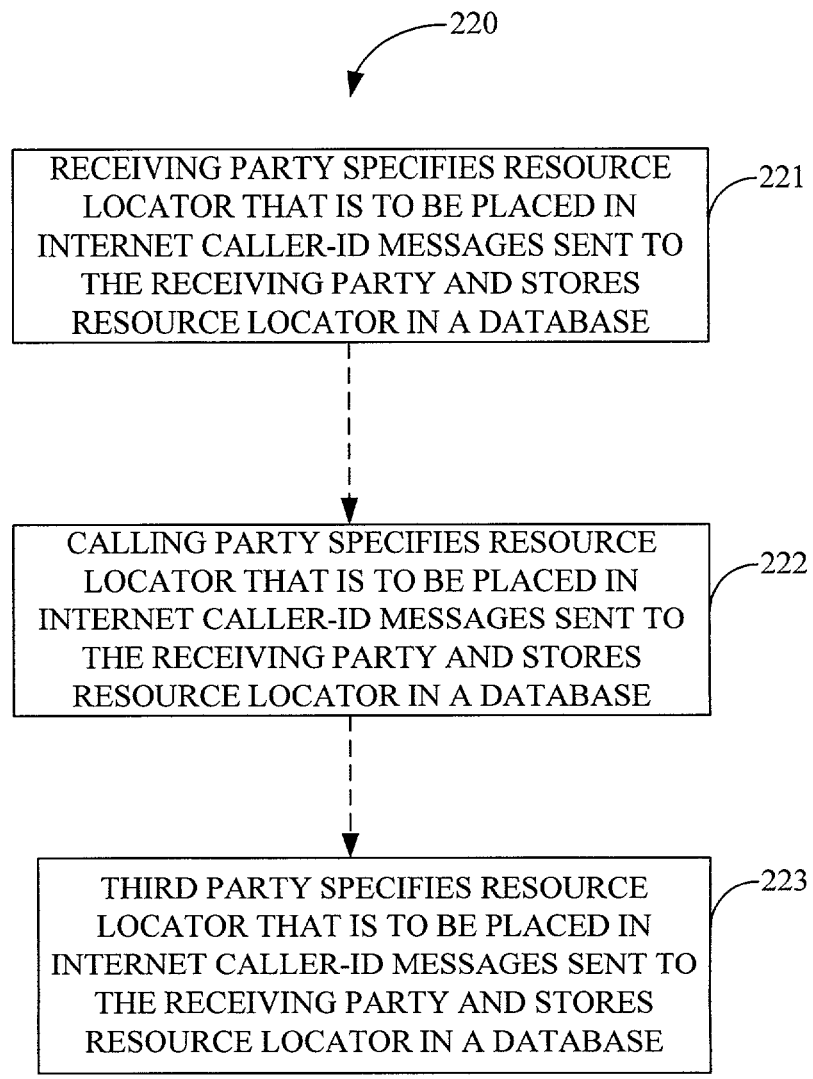
FIG. 2B is a flowchart describing an embodiment of the process for designating a resource locator in FIG. 2.

As previously stated, the resource locator designations are kept in the profile database 156. The profile database 156 may be protected by a secure IP network 190 and could also be contained in the Internet caller-ID server 150. Each resource locator is an address for a resource or document that may be retrieved by the recipient of an Internet caller-ID message and is associated with a phone number or phone numbers of the receiving party or calling party. The resource locator may be specified by a URL address like (with # replaced) http://#.net/me.htm or file://businessfile.txt. Since more than one resource locator could be contained in the message, a party may designate more than one resource locator to be contained in the message, or multiple parties may separately designate resource locators. For example, a receiving party 130, a calling party 140, or a third party may designate a multitude of resource locators that may be contained in the Internet caller-ID message. Therefore in the profile database 156, both the calling party and the receiving party may have resource locators designated that can be placed in the Internet caller-ID message. FIG. 2B is a flowchart depicting an embodiment of the process for designating a resource locator 220 and is discussed further below.

a. Receiving Party

As part of registering to the Internet caller-ID service, a receiving party 130 may have the capability of designating resource locators for the caller-ID messages it receives. Therefore, as shown in block 221, the receiving party could provide a resource locator and have this information stored in the receiving party's profile in the profile database 156. For instance, the receiving party may keep a database of customer records that are organized by a customer's phone numbers. Therefore, in the receiving party's profile, the receiving party 130 could designate the parameterized URL http://www.#.net/records.html?CN=CallingDN as a resource locator, where the portion of the URL information indicated by "CallingDN" is replaced by the Internet caller-ID server 150 with the calling party's telephone number in the Internet caller-ID message. Accordingly, for each phone number that calls the receiving party, the receiving party will have instant access to a business record for that phone number.

b. Calling Party

If the calling party 140 has registered for the Internet caller-ID service, he or she may also have the ability to designate resource locators that are contained in the Internet caller-ID messages that are triggered by the calling party's 140 phone calls. For example in block 222, the calling party 140 may provide, as part of its profile to the profile database 156, the resource locator that it would like made available to a receiving party 130 it is calling.

The calling party's resource locator designation may point to a multitude of objects, including a personal web page of the calling party 140 or a favorite music file that a receiving party 130 could access by activating the resource locator in the message.

If a receiving party does not have a preexisting web page to specify, then the Internet caller-ID service could provide as part of its profile setup, the option of filling out a form and having a web page automatically created for the user. If the calling party is not registered for Internet caller-ID service or if a resource locator has not been stored in the profile database 156 for a particular telephone number, a resource locator could still be contained in the message that pertains to the calling party 140: As a default, the message could provide a standard link to the receiving party's 130 listing in an on-line telephone directory, such as in the white or yellow pages, where the telephone directory listings are kept in a database in the telephone network 110.

c. Third Party

A caller-ID message may additionally contain a resource locator that is designated by a third party, perhaps at the permission of either the receiving party 130 or calling party 140. For example, a receiving party 130 or calling party 140 may separately agree with a third party that that the third party may add a resource locator to an Internet caller-ID message by storing a resource locator associated with the party's phone number in a profile database 156 for one of the parties having a profile, as depicted in block 223. For example, the receiving party 130 may agree to let a third party announce updates or news pertaining to the third party's website through the caller-ID messages that the receiving party 130 receives. Likewise, a third party may want its announcements to go out on the Internet caller-ID messages that a calling party 140 initiates through its outgoing calls. Therefore for this benefit, a third party may reimburse the receiving party 130 or calling party 140 in the form of, possibly, monetary consideration, subsidizing telephone services, such as the Internet caller-ID service fee, or providing third party services to the calling party 140. Additionally, a receiving 130 or calling party 140 may prefer to have a resource locator be designated by a third party without consideration. For example, a party may be inclined to have a daily horoscope or weather report be provided by the resource locator in the Internet caller-ID messages it sends or receives.

In order to designate the resource locator, the third party could be provided access to the profile database 156 so that the third party would have the ability to store a resource locator in the receiving party's 130 or calling party's 140 profile. Accordingly, in one embodiment of this process, the third party makes an agreement with the provider of the Internet caller-ID service for the ability to add resource locator entries to the profile database 156.

3. Placing the Call

Figure 2C:
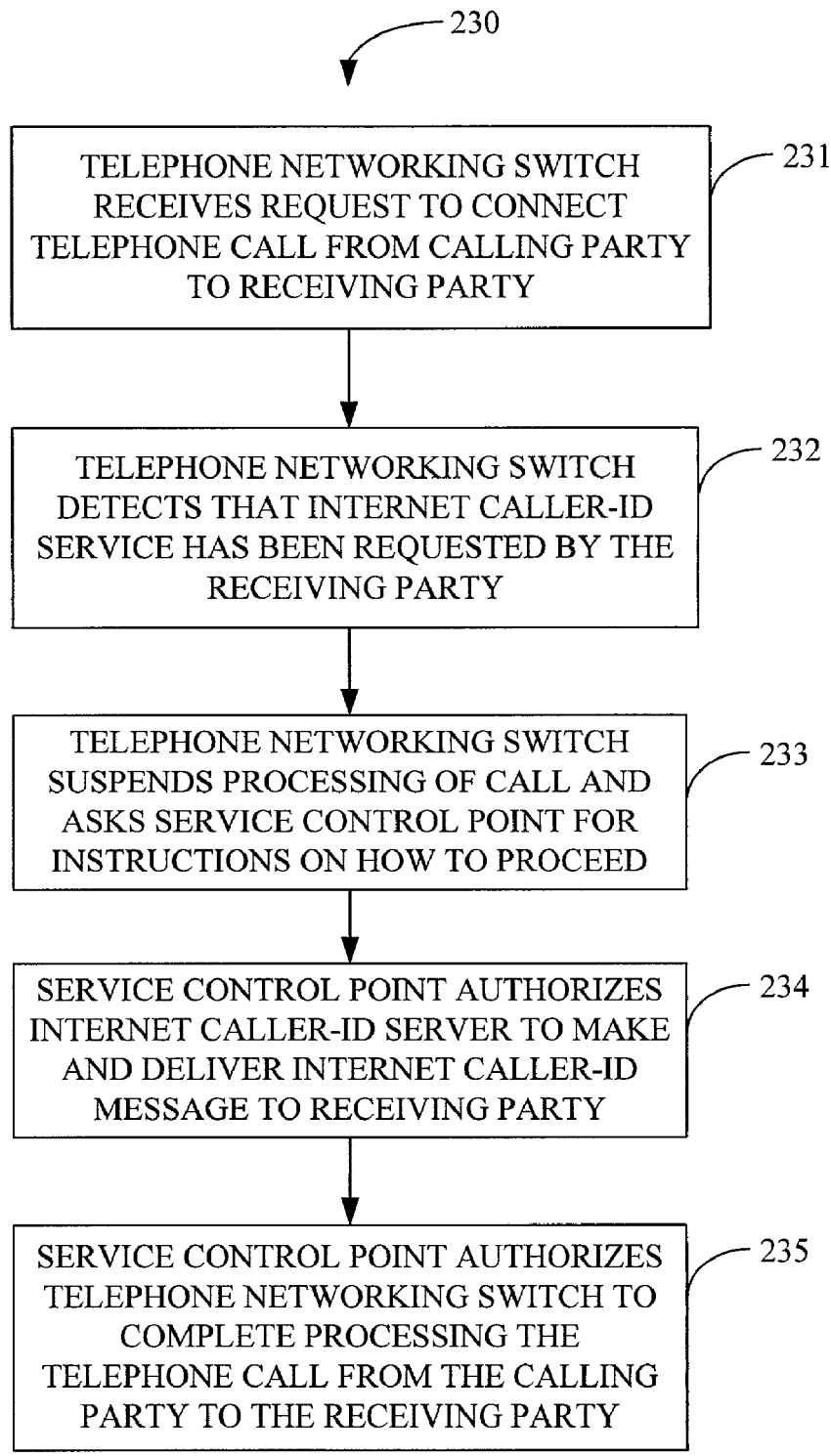
FIG. 2C is a flowchart describing an embodiment of the process for placing a telephone call included in FIG. 2.

In block 230, the calling party 140 places the telephone call to a receiving party 130. Within the telephone network 110, representative switches 112, 116 are utilized to route calls between points or destinations within the telephone network 110. Associated with telephone calls are services such as call-waiting, call-forwarding, and the conventional caller-ID. When a switch 112 identifies that a service has been requested by either the telephone number originating the call or the telephone number receiving the call, the switch 112 suspends processing of the call and forwards information about the call to a service control point 114, such as a SCP in a signal system seven (SS7) network or a softswitch in a digital VoIP network. The service control point 114 recognizes the type of service requested from the telephone number and informs the switch 112 on how to handle the call. For example, FIG. 2C shows an embodiment of this process of the present invention. In block 231, the switch 112 servicing the calling party 140 receives the request for a connection to be made to the telephone number of the receiving party 130. In block 232, the switch 112 detects that a telephone service has been requested. The switch 112 asks the service control point 114 on how to proceed and temporarily suspends normal call processing, as shown in block 233. The service control point 114 then authorizes the Internet caller-ID server 150 to make and deliver an Internet caller-ID message, as shown in block 234. In block 235, the service control point 114 tells the switch 112 to start processing the call again.

4. Generating the Message

Figure 2D:
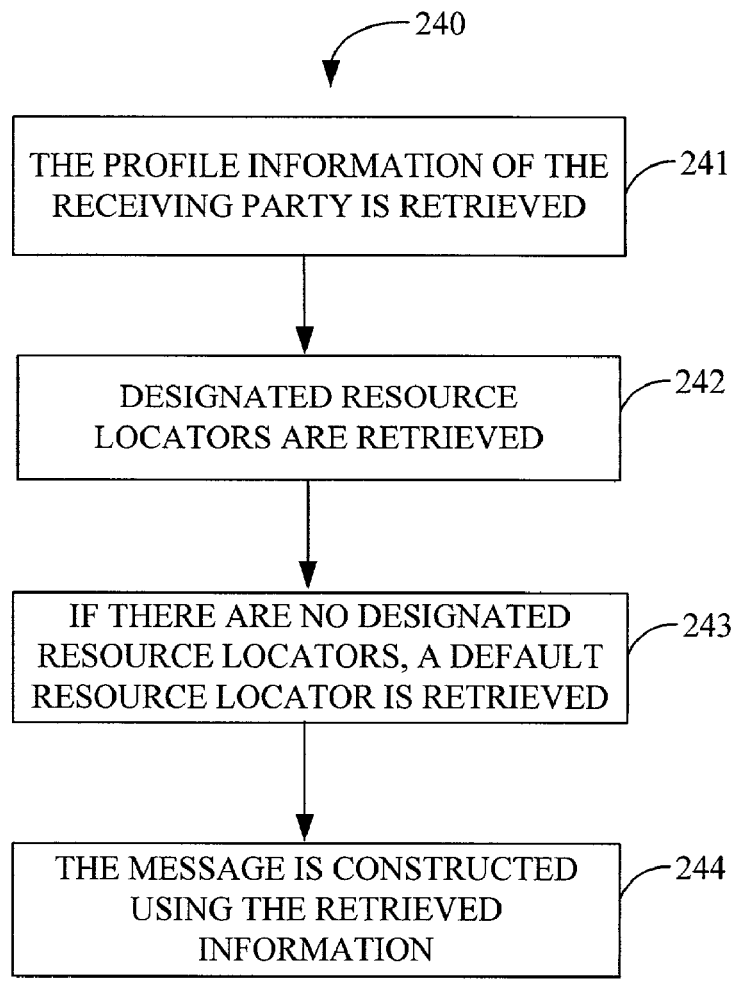
FIG. 2D is a flowchart describing an embodiment of the process for making an Internet caller-ID message included in FIG. 2.

FIG. 2D is a flowchart depicting an embodiment of a process for generating the Internet caller-ID message 240. In block 241, with the service control point's 114 authority, the Internet caller-ID server 150 retrieves the profile information of the receiving party 130, which includes the receiving party's delivery transport address. Additional information such as the caller's name, time, date, and the caller's home address may also be retrieved from the profile database 156 or other databases in the telephone network. Further in block 242, the Internet caller-ID server 150 retrieves the resource locator(s) from the profile database 156 that are to be included in the Internet caller-ID message. If a resource locator is not designated for a particular number in the profile database 156, then in the message, a default resource locator may be provided, such as an Internet address for a online white or yellow page listing of the calling party, as depicted in block 243. With this collected information, the Internet caller-ID message may be constructed 240, as shown in block 244.

Figure 3:
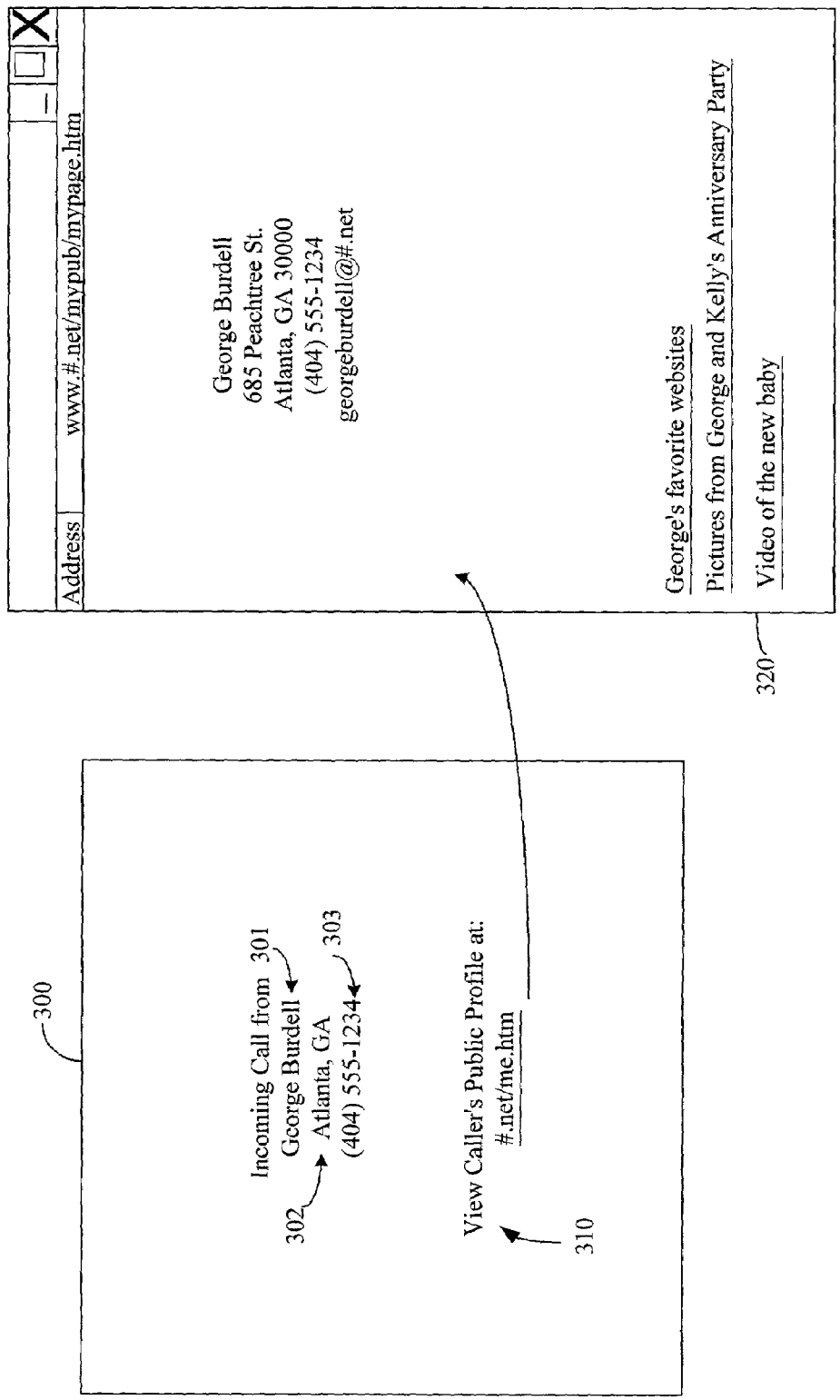
FIG. 3 is a diagram of one embodiment of an Internet caller-ID message.

FIG. 3 shows a representation of one example, among others, of the content that is contained in an Internet caller-ID message for one embodiment of the present invention. One portion of the illustration approximates an instant message display 300 that the internet-connected device 132 of the receiving party would display. As shown, the instant message display 300 may comprise the name 301, address 302, and phone number 303 of the calling party, along with a resource locator 310. The other portion of the illustration approximates the web browser display 320 that would appear when the receiving party activates the resource locator 310 (or "link") imbedded in the instant message. In this example, the resource locator 310 is an Internet URL of a web page 320 hosted by the calling party 140.

5. Delivering the Message

Figure 2E:
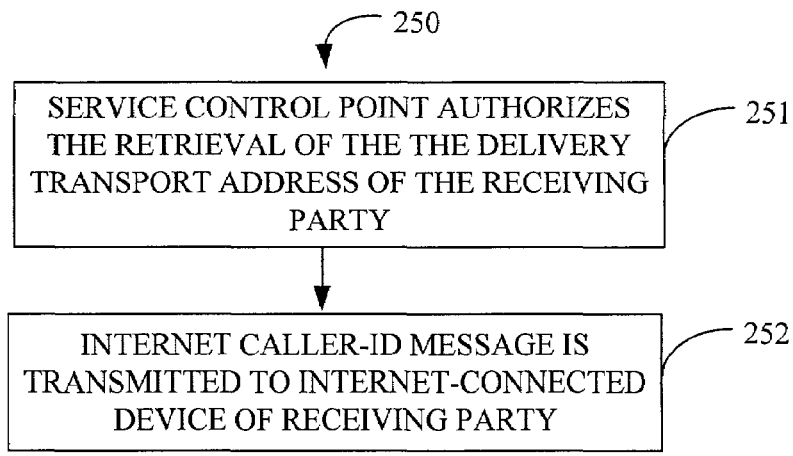
FIG. 2E is a flowchart describing an embodiment of the process for delivering an Internet caller-ID message included in FIG. 2

FIG. 2E is a flowchart depicting an embodiment of a process for delivering the Internet caller-ID message 250. With the receiving party's delivery transport address, the service control point 114 authorizes the Internet caller-ID server 150 to retrieve the profile information for the receiving party 130. The profile information is retrieved from the Internet caller-ID profile database 156 via the Internet caller-ID server 150, as depicted in block 251. The Internet caller-ID server 150 uses the delivery transport address to send the Internet caller-ID message over the Internet to the Internet-connected device 132 of the receiving party, as shown in block 252.

a. Push Technology

Figure 2F:
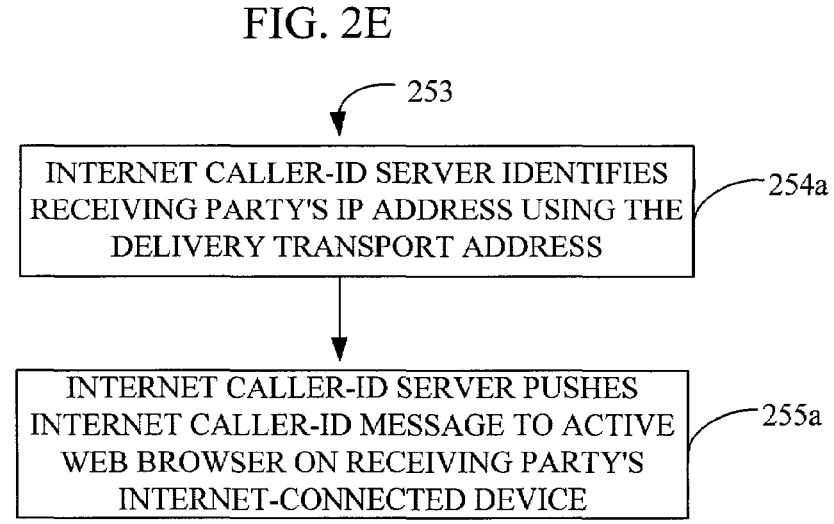
FIG. 2F is a flowchart describing an embodiment of the process of FIG. 2E for delivering an Internet caller-ID message using push technology.

FIG. 2F depicts one exemplary embodiment of a process for delivering an Internet caller-ID message 250 using push technology. In block 254a, the Internet caller-ID server uses the delivery transport address to determine the IP address of the Internet-connected device 132. This may occur in a number of ways. For example, the identity of the receiving party's ISP may be the provider of the receiving party's phone services and therefore may be known to the Internet caller-ID server 150. Alternatively, the identity of the ISP 170 may be provided in the receiving party's profile and then may be obtained at the same time that the Internet caller-ID server 150 retrieves the receiving party's 130 delivery transport address. After obtaining the identity of the ISP 170, the Internet caller-ID server 150 could request the IP address from an IP mapping database 175, where the IP mapping database 175 is maintained by the personal ISP 170 of the receiving party.

For instance, whenever the receiving party 130 logs in to its ISP 170 it is dynamically allocated an Internet address by the ISP 170. When the receiving party 130 logs off and discontinues its Internet session, the Internet address is reallocated and is no longer associated with the receiving party 130. Accordingly, the next time the receiving party 130 logs in to its ISP 170 it will receive another address that is highly likely to be different than the previous IP address. Therefore, the IP mapping database 175 stores all the current IP addresses for the active users of the ISP 170. The Internet caller-ID server requests and receives the current IP address from the ISP 170, where the ISP 170 retrieves the information from the IP mapping database 175. In block 255a, after obtaining the current IP address, the Internet Caller-ID server "pushes" the Internet caller-ID message, in the form of a web page, over the Internet, to an active web browser loaded on the Internet-connected device 132.

Please note, in the most general sense, delivery of an Internet caller-ID message can be accomplished using a low level protocol like TCP or UDP. For example, if the address of the receiving party's Internet-connected device 132 is designated as the delivery transport address of the receiving party 130, the internet caller-ID server 150 could initiate a connection to the receiving party's Internet-connected device 132 and communicate the internet caller-ID message to the receiving party 130.

b. Instant Messaging

Figure 2G:
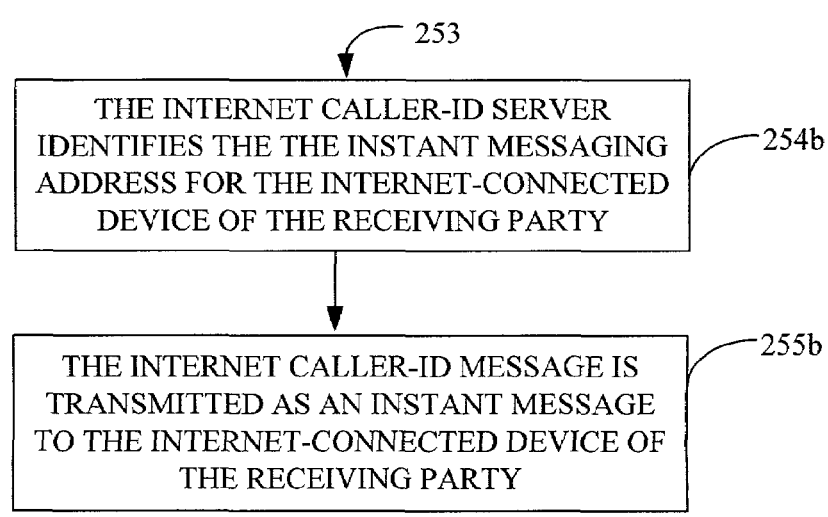
FIG. 2G is a flowchart describing an embodiment of the process of FIG. 2E for delivering an Internet caller-ID message using instant messaging technology.

Another exemplary embodiment of a process of delivery is depicted in FIG. 2G. Here, instant messaging technology is used. In block 254b, the instant messaging address for the receiving party's Internet-connected device 132 is determined using the delivery transport address. For example, the delivery transport address may be the receiving party's instant messaging address, such as fred@jabber.bellsouth.com. With the progression toward an open and interoperable instant messaging protocol, such as the XML based instant messaging system Jabber, this may be all that is needed to deliver an instant message to the receiving party, since an instant message could be addressed in the same fashion as an email address.

In a closed environment, the delivery transport address could be the name of the receiving party's instant messaging userID or nickname. Therefore, the receiving party's instant messaging provider would also be provided in the receiving party's profile with any other information that may be needed. Accordingly, the Internet caller-ID server 150 may authenticate itself to the instant messaging service 170 and act as a surrogate or proxy client on the server. In this manner, the Internet caller-ID server can send instant messages to the receiving party 130.

Therefore, in block 255b, the Internet caller-ID message is transmitted as an instant message to the Internet-connected device 132 of the receiving party. The active instant messaging client installed on the Internet-connected device 132 receives and displays the Internet caller-ID message. Typically, the instant messaging client will be already installed and running on the Internet-connected device 132 before an Internet caller-ID message is sent.

6. Receiving the Message and Telephone Call

Figure 2H:
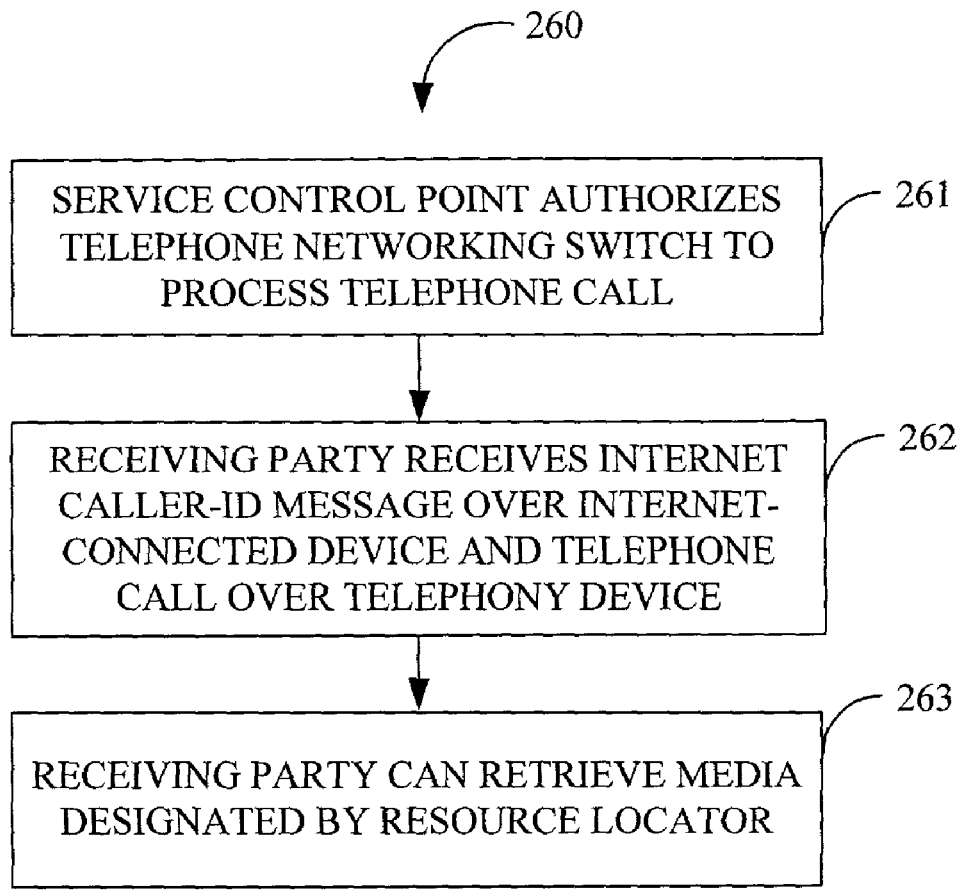
FIG. 2H is a flowchart describing an embodiment of the process receiving an Internet caller-ID message included in FIG. 2.

FIG. 2H depicts an embodiment of a process 260 for receiving the Internet caller-ID message and completing the telephone call from the calling party 140 to the receiving party 130. In block 261, after the service control point 114 authorizes the Internet caller-ID server 150 to send the Internet caller-ID message, the service control point 114 authorizes the switch 112 to proceed with completing the calling party's 130 telephone call to the receiving party 140. Hence in block 262, the receiving party 130 receives an Internet caller-ID message on its Internet-connected device 132 at about the same time that it receives a telephone call on its telephony device 131. The receiving party 130 reads the Internet caller-ID message to see who is calling. Additionally, the receiving party 130 can also activate any of the resource locator(s) 350 provided before, during, or after the call is completed, as shown in block 263. Further, if the call is not answered by the receiving party 130 party, the receiving party 130 can still access the resource locator 350 that is contained in the Internet caller-ID message.

C. Flow Diagrams

Figure 4:
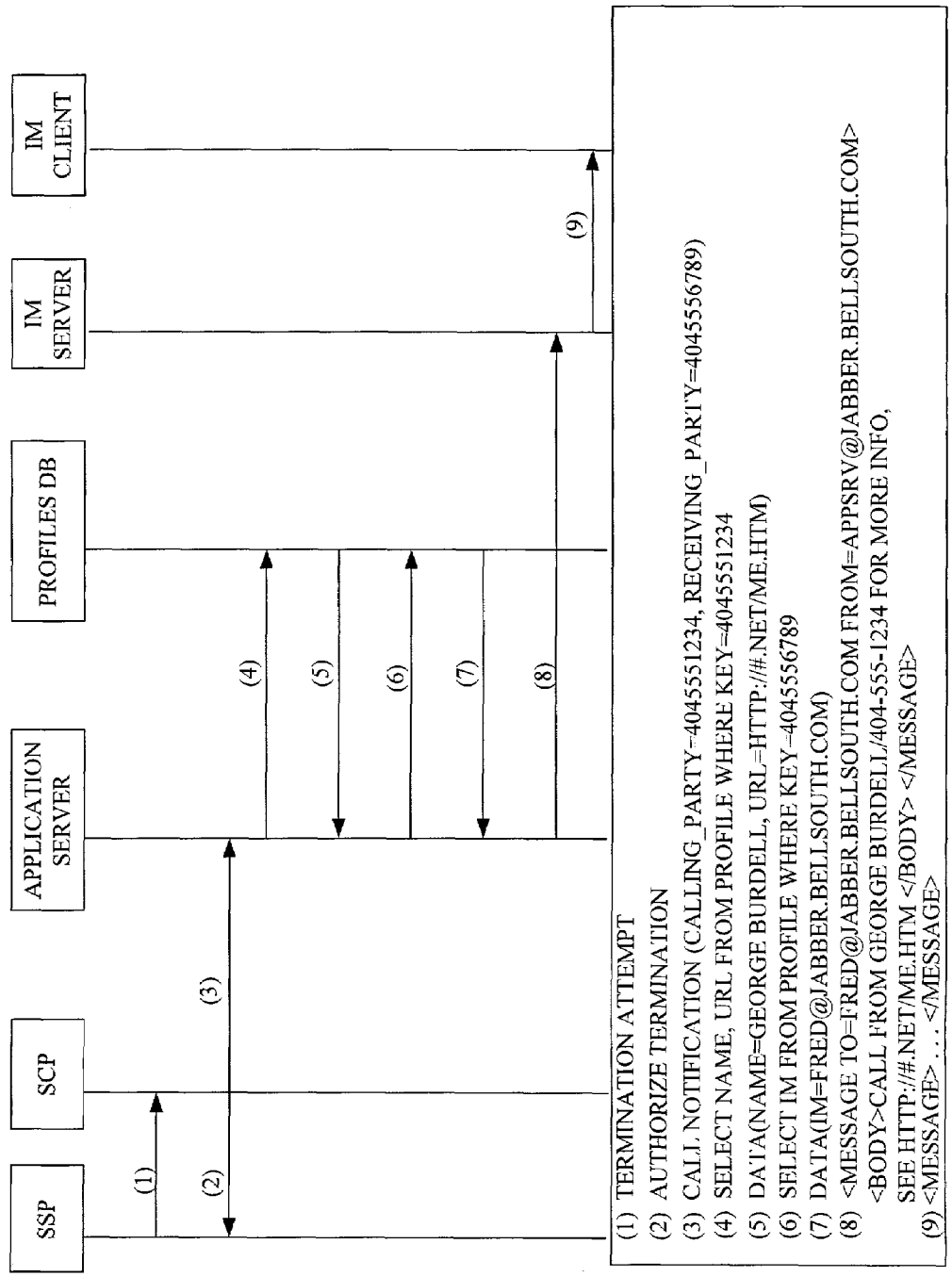
FIG. 4 is a diagram of the service flow of one embodiment of an Internet caller-ID system where the calling party provides a resource locator according to the present invention.

FIGS. 4 and 5 show service flow diagrams for implementations of the present invention. The diagram of FIG. 4 specifically shows an example service flow for an embodiment of the present invention as would be provided to a PSTN subscriber. In this scenario, the subscriber is the receiving party 130 at the phone number 404-555-6789. This example illustrates a variety of the service in which the calling party 140 defines the resource locator 310 that is to be sent with each call. For this example, it is assumed that the resource locator is in the form of a URL; and the calling party 140 and the receiving party 130 are both represented in a subscriber profile database record which provides common profile information. This information includes at least the following: name, URL, instant messaging address. The application logic resides in the application server 150 (Internet caller-ID server) and implements functionality that allows it to appear as a regular user to an instant messaging server 190. This is known as a surrogate or proxy client. The surrogate/proxy client has connected and authenticated itself to the instant messaging service 170 prior to the initiation of this call scenario.

The call is first presented to the telephone networking switch 112, which is an service switching point (SSP) in a signaling system 7 (SS7)/PSTN advanced intelligent network (AIN) 110, where the SSP 112 hosts the receiving party subscriber line. The subscriber line is provisioned with an AIN termination attempt trigger. Upon encountering the trigger, the SSP 112 will send (1) a TERMINATION ATTEMPT (TAT) query message over the SS7 network 110 to a SCP (service control point) 114 where an AIN trigger handling logic resides. Note, the use of AIN triggers is for example only, other mechanism exists for triggering on an inbound call. For example, in a voice over IP environment, the service could be triggered upon receipt of a session initiation protocol (SIP) invite message by a SIP proxy server.

Upon receipt of the TAT query, the SCP 114 will immediately respond to the SSP 112 with (2) an AUTHORIZE TERMINATION message. In conjunction with this message, the SCP 114 will send a (3) Call Notification message to an application server 150 in which the Internet caller-ID service application logic resides. There are several possible alternate implementations to the form of this notification. The notification could be accomplished using a distributed procedure call mechanism such as CORBA or Java RMI, or it could be transmitted via an ordinary TCP or UDP connection. It is assumed that a variety of methods would be apparent to someone of ordinary skill in the art.

Note, the distinction between SCP (service control point) 114 and the application server (Internet caller-ID server) 150 is a logic distinction. It is not necessary that the functions be provided by separate network elements. It is possible to realize an implementation of this service where the trigger handling logic and application logic are provided by the same application within the same network element.

Upon receipt of the Call Notification (3) message, the application logic will query a database 156 to determine the resource locator and name of the caller, and the instant messaging address of the subscriber. These transactions are show in flows 4-7. In this example, the profile database 156 is assumed to be a relational database implementing the SQL query language. However, the specific representation of the profile database 156 is not important. Alternate implements should be apparent using a number of different access and storage methods. One such example is the use of remote directory server implementing the light-weight directory access protocol (LDAP).

After retrieving the needed information from the profile database 156, the application service logic in the Internet caller-ID server 150 will build and send an instant message (8) to the instant messaging server 190. Upon receipt of the message, the instant messaging server 190 will forward the message (9) to the receiving party's instant messaging client 132. In this example, we have elected to show an interaction with Jabber—an open source instant messaging service defined using XML. Jabber provides at least one widely available instant messaging client that presents URL information in an active form. That is, it allows the user to mouse-click on the URL and open a browser session and view the HTML content. Implementations using other instant messaging services should be apparent to one of ordinary skill in the art.

The diagram of FIG. 5 shows an alternative implementation in which the resource locator information is not under the control of the calling party 140 but is, instead, provided in the form of a template which may be under the control of the subscriber 130 (receiving party). The call flow is identical to the previous flow except that information about the calling party 140 is not retrieved. Instead, when the resource locator information is retrieved from the receiving party 130 profile, the portion of the URL information indicated by "CallingDN" is replaced with the calling party's telephone number in the Internet caller-ID message. All other elements of the service are as described above. The URL syntax is for example only.

This form of the preferred embodiment of the invention allows the calling party to control the information being provided. It could be used to allow a user to bind access to their own web content to inbound calls. For example, a user might elect to have a web front end to a customer relationship management package. The URL template could be constructed such as to allow access to this web based system.

The enhanced visual capabilities of the above-described embodiments of the present invention advantageously leads to an improved system and method for providing a full set of information about the maker of a telephone call. The information delivered may be contained in a web server, based on content created by the calling party prior to the call, or other information, such as announcements from third parties. It should be emphasized that the above-described embodiments of the present invention are merely possible examples of implementations, merely set forth for a clear understanding of the principles of the invention. Many variations and modifications may be made to the above-described embodiment(s) of the invention without departing substantially from the principles of the invention. For example, it is contemplated that an embodiment of the present invention will include the features of conventional caller-ID services in addition to the new features discussed herein. Therefore, under the principles of the present invention, standard caller-ID features such as caller-ID blocking are contemplated. Accordingly, it will be understood by those skilled in the art that the present invention is not limited to the specific implementations shown in the figures. For example, information stored in separate databases in one embodiment of the invention could be collectively stored in a single database in another embodiment of the invention. Further, other Internet transport mediums, such as email and or SMS messaging, may be used to deliver the Internet caller-ID messages. Accordingly, all such modifications and variations are intended to be included herein within the scope of the disclosure and the present invention and protected by the following claims.

Therefore, having thus described the invention, at least the following is claimed:

1. A method for supplying calling party information to a receiving party having an Internet-connected device coupled to the Internet, wherein a calling party places a telephone call to the receiving party over a telephone network, comprising:
   routing a telephone call from the calling party to the receiving party;
   during routing of the telephone call, detecting whether the receiving party has Internet caller-ID service;
   if the receiving party has Internet caller-ID service, retrieving a profile for the receiving party from a database, the profile including a resource locator specified by at least one of the receiving party, the calling party, or a third party, the profile further including a URL template for providing access to a web-based customer relationship management package; and, if the receiving party does not have Internet caller-ID service, then retrieving a default profile from the database;
   constructing an Internet caller-ID message using the retrieved profile or the retrieved default profile;
   retrieving a delivery transport address for the receiving party from a database and using the delivery transport address to identify at least one of an IP address for the receiving party or an instant messaging address for the receiving party; and
   sending the Internet caller-ID message to the Internet-connected device of the receiving party before completion of the telephone call by at least one of: pushing the Internet caller-ID message to an active web browser on the Internet-connected device of the receiving party, or transmitting the Internet caller-ID message as an Instant Message to the Internet-connected device of the receiving party.

2. The method of claim 1, further comprising:
   suspending routing of the telephone call after the Internet caller-ID service is detected; and
   continuing routing of the telephone call after the Internet caller-ID message is sent.

3. The method of claim 1, wherein detecting whether receiving party has Internet caller-ID service further comprises:
   detecting the phone number of the receiving party; and
   retrieving call routing instructions for the detected phone number.

4. The method of claim 1, wherein generating an Internet caller-ID message further comprises:
   retrieving information associated with the calling party to include in the Internet caller-ID message if the calling party is a subscriber to the Internet caller-ID service, the information to be added to the Internet caller-ID message sent to the receiving party.

5. The method of claim 4, wherein the information further includes the phone number of the calling party.

6. The method of claim 5, wherein the information further includes a resource locator designated by the calling party.

7. The method of claim 5, wherein the information further includes a resource locator designated by a third party.

8. The method of claim 5, wherein the information further includes the name of the calling party.

9. The method of claim 8, wherein the information further includes the address of the calling party.

10. The method of claim 4, wherein generating an Internet caller-ID message further comprises:
    including the information concerning the calling party in the Internet caller-ID message.

11. The method of claim 10, wherein generating an Internet caller-ID message further comprises:
    retrieving information associated with the receiving party to include in the caller-ID message.

12. The method of claim 11, wherein the information associated with the receiving party further includes a resource locator designated by the receiving party.

13. The method of claim 11, wherein the information associated with the receiving party further includes a resource locator designated by a third party.

14. The method of claim 11, wherein generating an Internet caller-ID message further comprises:
    including at least some of the information concerning the receiving party in the Internet caller-ID message.

15. The method of claim 1, wherein sending the Internet caller-ID message to the receiving party before completion of the telephone call further comprises:
    retrieving a delivery transport address of the receiving party from a profile of the receiving party stored in a central database; and
    using the delivery transport address of the receiving party to transmit the Internet caller-ID message over the Internet to the Internet-connected device of the receiving party.

16. The method of claim 15, wherein the delivery transport address is an IP address of the Internet-connected device of the receiving party.

17. The method of claim 15, wherein the delivery transport address is an instant messaging address, and the Internet caller-ID message is an instant message.

18. The method of claim 15, wherein the delivery transport address is an email address, and the Internet caller-ID message is an email.

19. The method of claim 15, wherein:
    the delivery transport address is an ISP login of the receiving party; the Internet caller-ID message is a web page; and
    the web page is pushed to an IP address associated with the ISP login.

20. The method of claim 1, further comprising:
    receiving the Internet caller-ID message at the Internet-connected device of the receiving party.

21. The method of claim 20, further comprising:
receiving the telephone call at the telephony device of the receiving party.

22. The method of claim 1, wherein constructing an Internet caller-ID message using the retrieved profile or the retrieved default profile further comprises:
including a resource locator in the Internet caller-ID message.

23. The method of claim 22, further comprising:
receiving the Internet caller-ID message at the Internet-connected device of the receiving party; and
activating the resource locator located in the Internet caller-ID message.

24. The method of claim 22, wherein the resource locator is an entry of the calling party in an online phone directory.

25. The method of claim 1, further comprising:
creating a profile of retrievable information concerning the receiving party; and
storing the profile, wherein the profile includes information that is included in the Internet caller-ID message.

26. The method of claim 25, wherein creating a profile of retrievable information concerning the receiving party further comprises:
providing in the profile a resource locator, wherein the resource locator is a URL designated by the receiving party.

27. The method of claim 25, wherein creating a profile of retrievable information concerning the receiving party further comprises:
providing in the profile of the receiving party a resource locator, wherein the resource locator is a URL designated by a third party.

28. The method of claim 1, further comprising:
creating a profile of retrievable information concerning the calling party; and
storing the profile, wherein constructing an Internet caller-ID message using the retrieved profile or the retrieved default profile includes information from the profile in the Internet caller-ID message.

29. The method of claim 28, wherein creating a profile of retrievable information concerning the receiving party further comprises:
providing in the profile a resource locator, wherein the resource locator is a URL designated by the calling party.

30. The method of claim 29, wherein creating a profile of retrievable information concerning the receiving party further comprises:
providing in the profile a resource locator, wherein the resource locator is a URL designated by a third party.

31. The method of claim 29, wherein creating a profile of retrievable information concerning the receiving party further comprises:
providing in the profile a resource locator, wherein the resource locator is a URL of a web page that is created for the calling party.

32. The method of claim 28, wherein creating a profile of retrievable information concerning the receiving party further comprises:
providing in the profile a phone number of the calling party.

33. The method of claim 32, wherein creating a profile of retrievable information concerning the receiving party further comprises:
providing in the profile an address of the calling party.

34. A system for supplying calling party information to a receiving party having an Internet-connected device coupled to the Internet, wherein a calling party places a telephone call to the receiving party over a telephone network, comprising:
an Internet caller-ID service detection system for detecting whether the receiving party has Internet caller-ID service during routing of the telephone call;
an Internet caller-ID message construction system connected to the Internet caller-ID service detection system wherein, if the receiving party has Internet caller-ID service, an Internet caller-ID message is constructed by retrieving a profile for the receiving party from a database, the profile including a resource locator specified by at least one of the receiving party, the calling party, or a third party, the profile further including a URL template for providing access to a web-based customer relationship management package; and, if the receiving party does not have Internet caller-ID service, then the Internet caller-ID message is constructed by retrieving a default profile from the database; and
an Internet caller-ID message transmission system connected to the Internet caller-ID message generation system for transmitting the Internet caller-ID messages to the receiving party before completion of the telephone call by retrieving a delivery transport address for the receiving party from a database and using the delivery transport address to identify at least one of an IP address for the receiving party or an instant messaging address for the receiving party; and by at least one of: (a) pushing the Internet caller-ID message to an active web browser on the Internet-connected device of the receiving party, or (b) transmitting the Internet caller-ID message as an Instant Message to the Internet-connected device of the receiving party.

35. The system of claim 34, wherein the system further comprises a system for routing the telephone call from the calling party to the receiving party.

36. The system of claim 35, wherein the Internet caller-ID service detection system routes the call from the calling party to the receiving party, detecting if the receiving party has designated the Internet caller-ID service, the system configured to authorize an Internet caller-ID message to be generated after Internet caller-ID service is detected; and authorize an Internet caller-ID message to be sent after the message is generated.

37. The system of claim 36, wherein the Internet caller-ID message generation system includes an Internet caller-ID server configured to generate the Internet caller-ID message.

38. The system of claim 37, wherein the system suspends routing of the telephone call after the system detects that the receiving party has Internet caller-ID service.

39. The system of claim 34, further comprising:
a communication station of the receiving party, wherein the communication station includes:
a telephone coupled to the telephone network; and
an Internet-connected device coupled to the Internet.

40. The system of claim 39, wherein the Internet-connected device is coupled to the Internet using DSL technology.

41. The system of claim 39, wherein the Internet-connected device is coupled to the Internet using cable modem technology.

42. The system of claim 39, wherein the Internet-connected device is coupled to the Internet using satellite communication technology.

43. The system of claim 39, wherein the Internet-connected device is coupled to the Internet using a dial-up service.

44. The system of claim 39, wherein the Internet-connected device is always on.

45. The system of claim 39, wherein the Internet-connected device is a computer.

46. The system of claim 34, wherein the telephone network is a VoIP network.

47. The system of claim 37, the Internet caller-ID server further configured to:
retrieve information associated with the calling party if the calling party is detected to have Internet caller-ID service; and
include the information in the caller-ID message.

48. The system of claim 37, the Internet caller-ID server further configured to:
retrieve information designated by the receiving party; and
include the information designated by the receiving party in the Internet caller-ID message.

49. The system of claim 48, the Internet caller-ID server further configured to:
retrieve a delivery transport address of the receiving party.

50. The system of claim 49, wherein the delivery transport address is an IP address of the Internet-connected device of the receiving party.

51. The system of claim 49, wherein the delivery transport address is an instant messaging address, and the Internet caller-ID message is an instant message.

52. The system of claim 49, wherein the address is an email address, and the Internet caller-ID message is an email.

53. The system of claim 50, wherein the Internet caller-ID message is a web page pushed to the Internet-connected device at the IP address.

54. The system of claim 37, further comprising:
a profile database storing a profile of retrievable information concerning the receiving party, wherein at least some information from the profile is used to determine the address for the Internet-connected device of the receiving party.

55. The system of claim 54, wherein at least some information from the profile is included in the Internet caller-ID message.

56. The system of claim 55, wherein a resource locator is contained in the profile and included in the Internet caller-ID message.

57. The system of claim 56, wherein the resource locator is designated by the receiving party.

58. The system of claim 56, wherein the resource locator is designated by a third party.

59. The system of claim 56, wherein the resource locator is a URL.

60. The system of claim 37, further comprising:
a profile database storing a profile of retrievable information concerning the calling party, wherein at least some information from the profile is included in the Internet caller-ID message.

61. The system of claim 60, wherein a resource locator is contained in the profile and included in the Internet caller-ID message.

62. The system of claim 61, wherein the resource locator is designated by the calling party.

63. The system of claim 61, wherein the resource locator is designated by a third party.

64. The system of claim 61, wherein the resource locator is a URL.

65. The system of claim 61, wherein the resource locator is a URL of an internet web page that is created for the calling party by a provider of the Internet caller-ID service.

66. The system of claim 65, further comprising a communication station of the calling party having an Internet-connected device coupled to the Internet.

67. The system of claim 37, wherein the Internet caller-ID server is further configured to:
include in the Internet caller-ID message an entry of the calling party from an online phone directory.

68. The system of claim 37, further comprising:
an instant messaging server connected to the Internet and capable of communicating with the Internet caller-ID server.

69. The system of claim 37, further comprising:
an Internet service provider connected to the Internet and capable of communicating with the Internet caller-ID server.

70. A computer readable medium having a program for supplying calling party information to a receiving party having an Internet-connected device coupled to the Internet, wherein a calling party places a telephone call to the receiving party over a telephone network, the program having instructions for performing:
routing a telephone call from the calling party to the receiving party;
during routing of the telephone call, detecting whether the receiving party has internet caller-ID service;
if the receiving party has Internet caller-ID service, retrieving a profile for the receiving party from a database, the profile including a resource locator specified by at least one of the receiving party, the calling party, or a third party, the profile further including a URL template for providing access to a web-based customer relationship management package; and, if the receiving party does not have Internet caller-ID service, then retrieving a default profile from the database;
constructing an Internet caller-ID message using the retrieved profile or the retrieved default profile;
retrieving a delivery transport address for the receiving party from a database and using the delivery transport address to identify at least one of an IP address for the receiving party or an instant messaging address for the receiving party; and
sending the Internet caller-ID message to the Internet-connected device of the receiving party before completion of the telephone call by at least one of: pushing the Internet caller-ID message to an active web browser on the Internet-connected device of the receiving party, or transmitting the Internet caller-ID message as an Instant Message to the Internet-connected device of the receiving party.

71. The computer readable medium of claim 70, the program further performing: retrieving information associated with the calling party if the calling party is a subscriber to the Internet caller-ID service, the information to be added to the Internet caller-ID message sent to the receiving party.

72. The computer readable medium of claim 70, wherein sending the Internet caller-ID message to the receiving party before completion of the telephone call further comprises:
retrieving a delivery transport address of the receiving party from a profile of the receiving party stored in a central database; and
using the delivery transport address of the receiving party to transmit the Internet caller-ID message over the Internet to the Internet-connected device of the receiving party.

73. The computer readable medium of 72, wherein the delivery transport address is an IP address of the Internet-connected device of the receiving party.

74. The computer readable medium of claim 72, wherein:
the delivery transport address is an ISP login of the receiving party; the Internet caller-ID message is a web page; and
the web page is pushed to an IP address associated with the ISP login.

75. The computer readable medium of claim 70, the program further performing:
creating a profile of retrievable information concerning the receiving party; and
storing the profile, wherein the profile includes information that is included in the Internet caller-ID message.

76. The computer readable medium of claim 75, wherein creating a profile of retrievable information concerning the receiving party further comprises:

providing in the profile of the receiving party a resource locator, wherein the resource locator is a URL designated by a third party.

77. The computer readable medium of claim 70, the program further performing:
creating a profile of retrievable information concerning the calling party; and
storing the profile, wherein the constructing includes information from the profile in the Internet caller-ID message.

78. The computer readable medium of claim 77, the program further performing:
providing in the profile of the calling party a resource locator, wherein the resource locator of the calling party is a URL designated by a third party.

* * * * *